United States Patent [19]
Watanabe et al.

[11] Patent Number: 5,909,100
[45] Date of Patent: Jun. 1, 1999

[54] CHARGING CONNECTOR FOR ELECTRIC VEHICLE

[75] Inventors: Kunihiko Watanabe; Heiji Kuki, both of Yokkaichi; Shuji Arisaka; Toshiro Shimada, both of Osaka, all of Japan

[73] Assignees: Sumitomo Wiring Systems, Ltd., Yokkaichi; Sumitomo Electric Industries, Ltd., Osaka, both of Japan

[21] Appl. No.: 08/908,620

[22] Filed: Aug. 8, 1997

[30] Foreign Application Priority Data

Aug. 9, 1996 [JP] Japan ................................. 8-211669
Feb. 13, 1997 [JP] Japan ................................. 9-028855
Jun. 26, 1997 [JP] Japan ................................. 9-170702

[51] Int. Cl.$^6$ ........................................ H02J 7/00
[52] U.S. Cl. ........................ 320/108; 320/109; 336/66
[58] Field of Search .............................. 320/108, 109; 336/66

[56] References Cited

U.S. PATENT DOCUMENTS

| | | |
|---|---|---|
| 3,995,209 | 11/1976 | Weston . |
| 4,912,735 | 3/1990 | Beer . |
| 5,379,021 | 1/1995 | Ito et al. . |
| 5,408,209 | 4/1995 | Tanzer et al. . |
| 5,412,304 | 5/1995 | Abbott . |
| 5,461,299 | 10/1995 | Bruni ........................................ 320/108 |
| 5,661,391 | 8/1997 | Ito et al. ................................. 320/108 |
| 5,703,461 | 12/1997 | Minoshima et al. .................... 320/108 |
| 5,710,502 | 1/1998 | Poumey .................................. 320/108 |

FOREIGN PATENT DOCUMENTS

| | | |
|---|---|---|
| A-552 737 | 7/1993 | European Pat. Off. . |
| A-39 23 525 | 3/1990 | Germany . |
| A-61-214407 | 9/1986 | Japan . |

*Primary Examiner*—Peter S. Wong
*Assistant Examiner*—K. Shin
*Attorney, Agent, or Firm*—Oliff & Berridge, PLC

[57] ABSTRACT

Groups of magnets are respectively provided on the joint surfaces of a vehicle-side connector and a power-supply-side connector in such a way that the N and S poles of a plurality of permanent magnets are alternately arranged in a circle. When charging is carried out, the magnetic attraction generated by placing the heteropolar magnets in both groups of magnets opposite to one another is utilized for bringing the vehicle-side connector and the power-supply-side connector into engagement with each other. After the charging, the group of magnets of the power-supply-side connector are turned by one pitch to place the homopolar magnets in both groups of magnets opposite to one another, whereby both connectors are easily separated from each other because of the magnetic repulsive force generated therebetween.

15 Claims, 25 Drawing Sheets

CHARGING CONNECTOR FOR ELECTRIC VEHICLE

BACKGROUND OF THE INVENTION

1. Field of the Invention

The present invention relates to charging connectors for an electric vehicle as those for use in charging the storage battery of such an electric vehicle.

2. Description of the Related Art

Charging connectors for an electric vehicle as those for use in charging the storage battery of the electric vehicle include a vehicle-side connector which is connected to the storage battery mounted in a vehicle body and also fastened to the vehicle body, and a power-supply-side connector which is connected to a power supply for supplying charging electric power. The charging operation is performed in such a state that the power-supply-side connector has been fitted in the vehicle-side connector. Upon the termination of the charging operation, the power-supply-side connector is then detached from the vehicle-side connector.

As the aforesaid charging connectors are generally of such a type that the operations of connecting and disconnecting the connectors are manually performed, charging work has to be done smoothly in particular.

In addition, U.S. Pat. No. 5,408,209, for example, describes a coupling apparatus of the sort mentioned above and as shown in FIG. 26, a slit 102 is formed in the predetermined position of the body of an electric vehicle 101 and a charging coupler 103 is made insertable in the slit 102.

A coupler accommodating portion 104 of the charging coupler 103 is provided under the slit 102. As shown in FIG. 27, the coupler accommodating portion 104 is equipped with a secondary core 105, a secondary coil 106 which is wound on the secondary core 105 and a channel 107 which is formed in the secondary core 105 and used for receiving the charging coupler 103. The charging coupler 103 is equipped with a primary core 108 and a primary coil 109 which is wound on the primary core 108 and the primary coil 109 is excited by a charging power supply. When the primary coil 109 is excited in such a state that the charging coupler 103 has been inserted in the coupler accommodating portion 104, electromotive force is generated in the secondary coil 106, whereby the power battery (not shown) of such an electric vehicle is charged.

With the arrangement above, the charging coupler 103 is inserted via the slit 102 in the channel 107 from above and taken out of the coupler accommodating portion 104 again by pulling it upward with a handle 103A on the termination of the charging operation.

The joint surfaces of the cores are exposed to the air when they are not used, though they are brought into engagement with each other at the time of charging. Consequently, extraneous substances may stick to the joint surfaces. In the aforementioned charging apparatus, the extraneous substances sticking to the joint surfaces 105A, 105A (see FIG. 27) of the secondary core 105 cannot easily be found nor cleaned because the secondary core 105 is situated in the depth of the coupler accommodating portion 104.

As shown in FIG. 27, moreover, the secondary core 105 has two joint surfaces 105A which are directed opposite to each other and the trouble is that the work of cleaning them has to be done twice by changing the direction of the cleaning means.

SUMMARY OF THE INVENTION

An object of the present invention made in consideration of the situation mentioned above is to effect improvement in workability when a power-supply-side connector is fitted in and detached from a vehicle-side connector.

An another object of the present invention made in view of the foregoing problems is to facilitate the work of finding extraneous substances sticking to joint surfaces of cores and cleaning them.

The foregoing object of the invention is achieved by providing a charging connector for an electric vehicle, the charging connector being connected to another connector so as to charge the storage battery of the electric vehicle, and having a connector holding magnet corresponding to a magnetic material disposed on the other connector side, whereby the magnetic force generated between the connector holding magnets and the magnetic material is utilized for bringing the charging connector and the other connector into engagement with each other.

According to the present invention, the magnetic force generated between the connector holding magnets and the magnetic material is utilized for bringing the charging connector and the other connector into engagement with each other. Consequently, the charging connector is prevented from being inadvertently detached from the other connector and thus the work of charging the storage battery is smoothly done.

Further, the object of the invention is also achieved by providing a charging device for an electric vehicle including: a vehicle-side connector which is connectable to a storage battery mounted in a vehicle body and is mountable on the vehicle body; and a power-supply-side connector which is connectable to a power supply for supplying charging electric power, wherein groups of magnets are respectively provided on facing sides of the vehicle-side connector and the power-supply-side connector in such a way that the N and S poles of a plurality of magnets are alternately arranged in a circle; the magnetic attraction generated by placing the heteropolar magnets in both groups of magnets opposite to one another is utilized for bringing the vehicle-side connector and the power-supply-side connector into engagement with each other; and the magnetic repulsive force generated by placing the homopolar magnets in both groups of magnets opposite to one another is utilized for detaching the power-supply-side connector from the vehicle-side connector.

According to this configuration of the present invention, the magnetic attraction generated brings the vehicle-side connector and the power-supply-side connector into engagement with each other at the time of charging and the magnetic repulsive force makes both connectors detachable from each other after the charging. Due to the magnetic attraction, the engagement of both connectors is facilitated and due to the magnetic repulsive force, the connectors are readily separated from each other. Thus, improvement in workability becomes achievable when one connector is fitted in and detached from the other.

In addition, the object of the present invention is also achieved by providing a magnetic coupling apparatus for charging the power batter of an electric vehicle by means of an external charging power supply including: a primary core with a primary coil which is wound on the primary core, coupled to the external charging power supply and a secondary core with a secondary coil which is wound on the secondary core, coupled to the power battery, said primary and secondary cores being jointable to one another so as to constitute a closed loop magnetic circuit, wherein the secondary core is accommodated in a recess so formed as to have an open portion in the exterior of the electric vehicle, and the joint surfaces of the secondary core jointing the primary core are formed in the open portion side of the recess.

With the arrangement above, the joint surfaces of the secondary core are directed to the open portion of the recess and consequently the joint surfaces of the secondary core communicate with the outside of the electric vehicle via the open portion of the recess while the secondary core is not used. Therefore, the operator is allowed to readily find extraneous substances sticking to the joint surfaces from the outside of the electric vehicle and to do the work of cleaning the joint surfaces by holding cleaning means thereto.

DETAILED DESCRIPTION OF THE PREFERRED EMBODIMENTS

Embodiment 1

Figure 1:
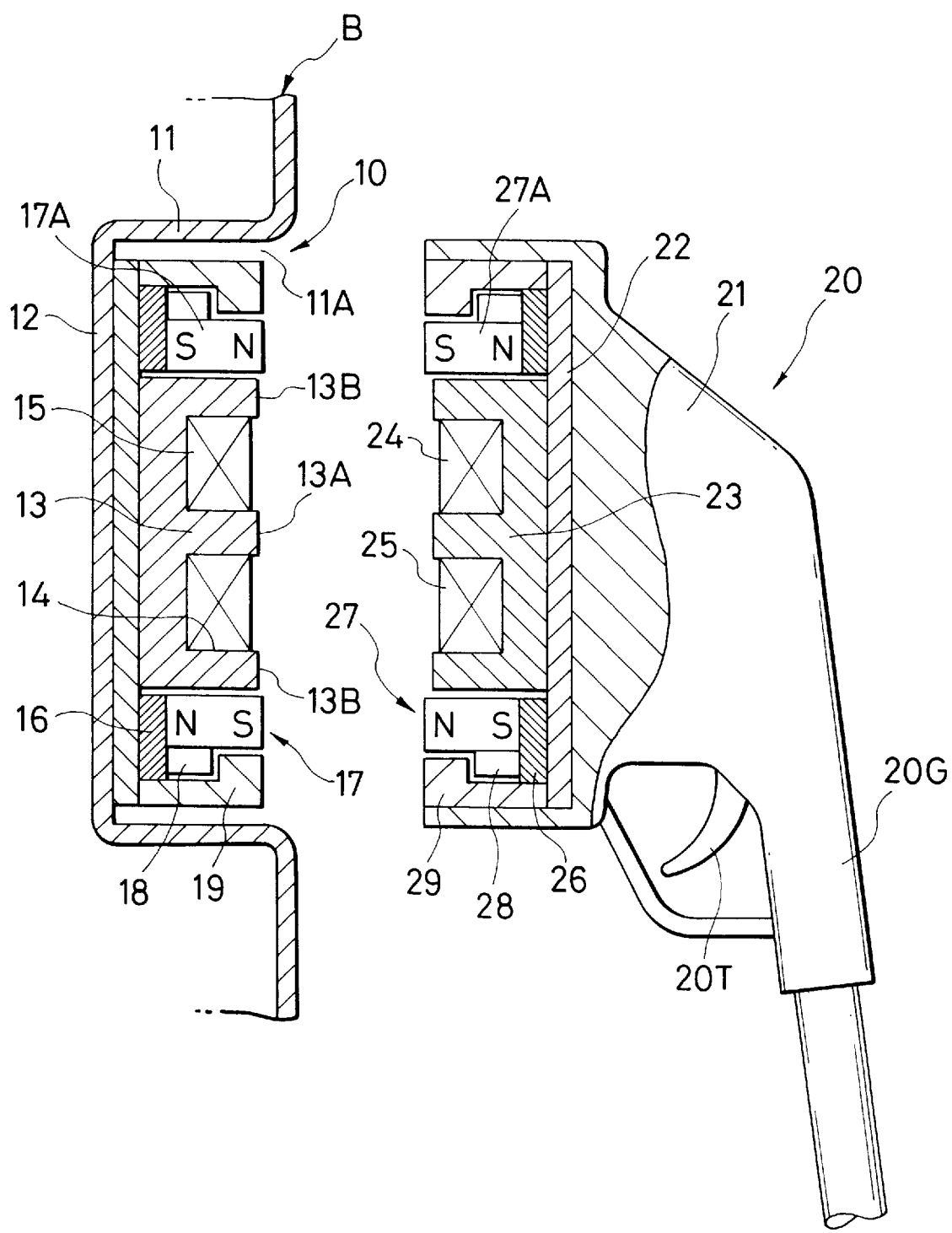
FIG. 1 is a side sectional view showing a state in which connectors have been detached from each other in Embodiment 1 of the present invention.
Figure 2:
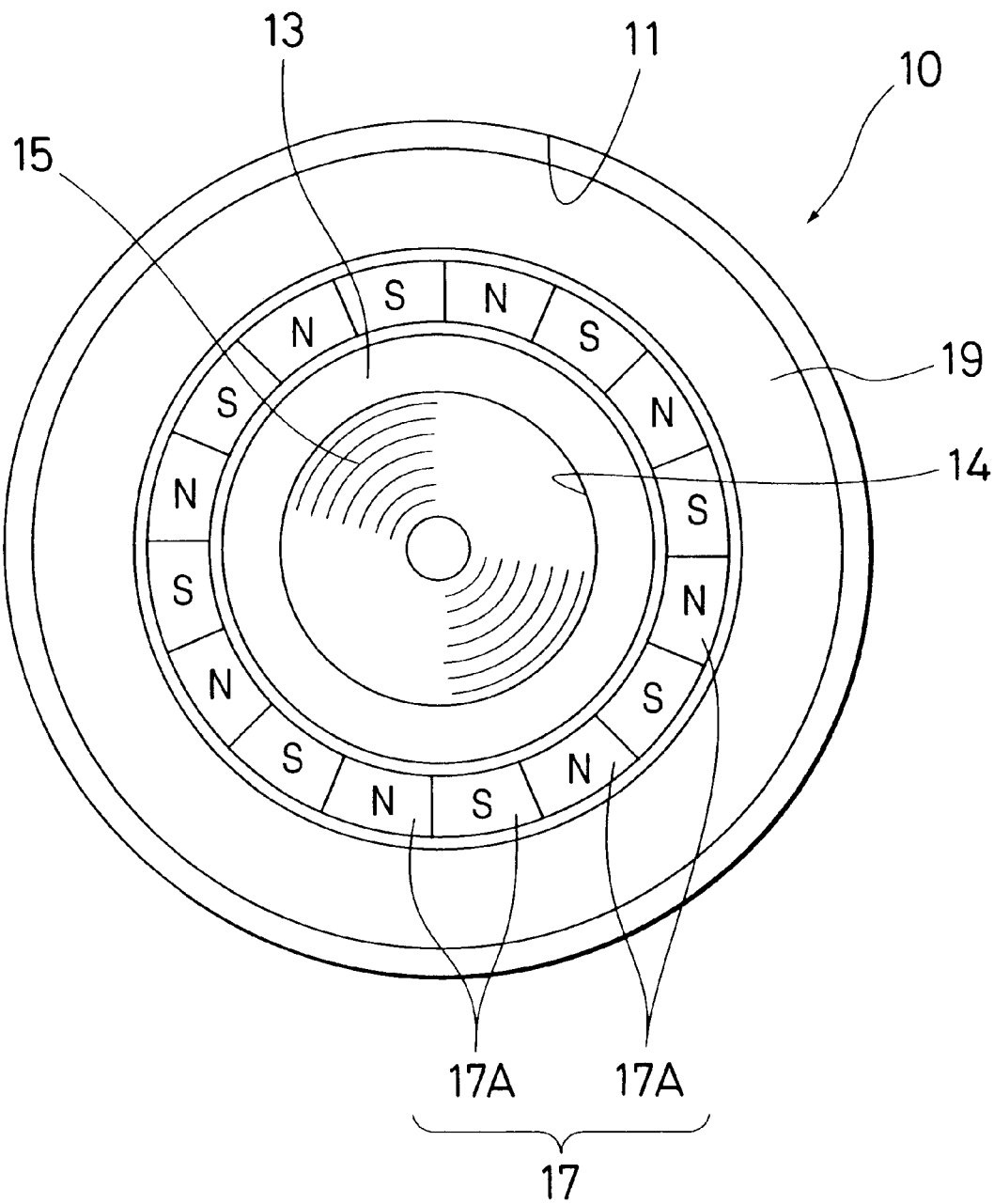
FIG. 2 is an elevational view of a secondary core in Embodiment 1 of the present invention.
Figure 3:
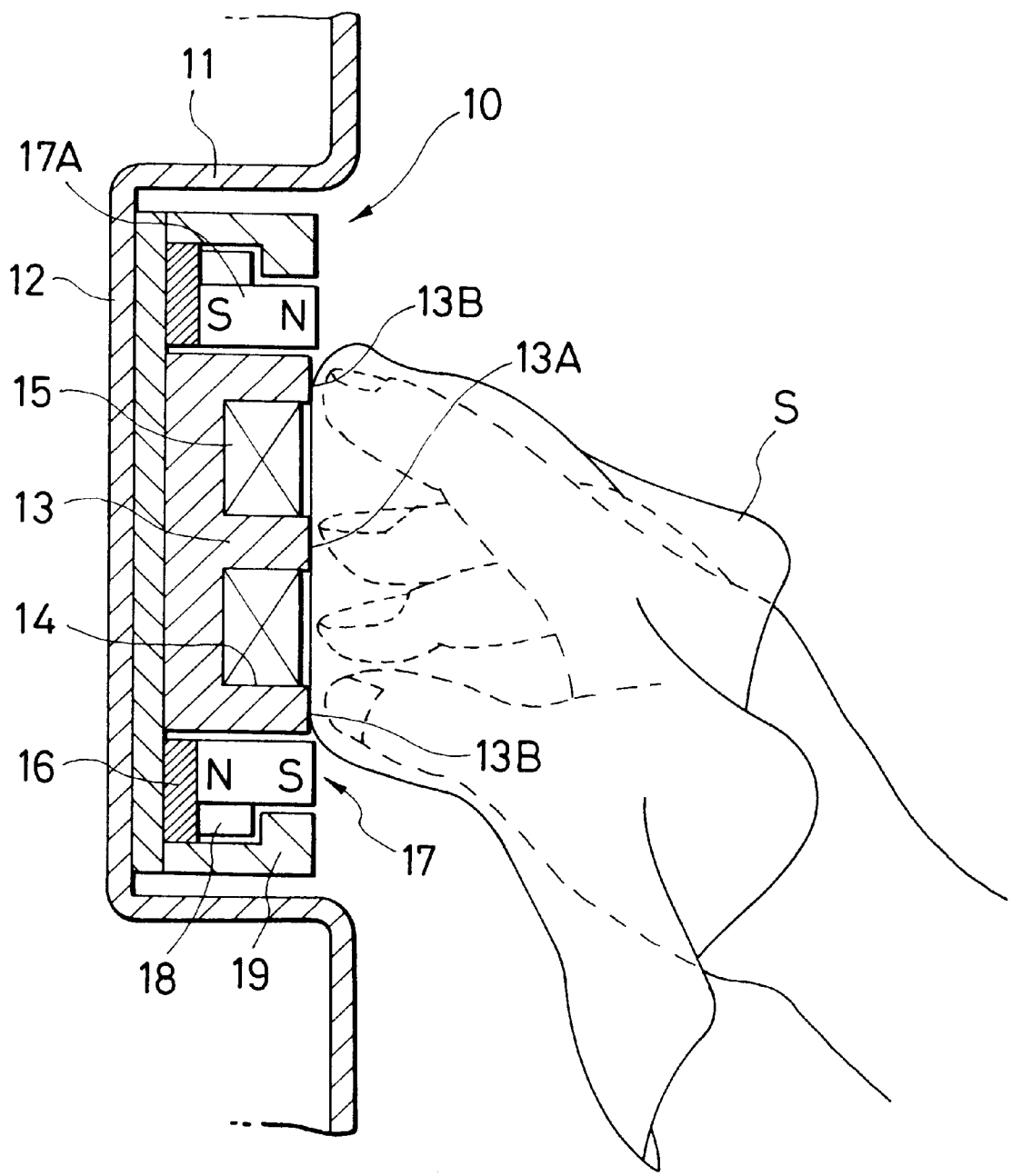
FIG. 3 is a side sectional view showing a situation in which the work of cleaning the core is being done according to Embodiment 1 of the present invention.
Figure 4:
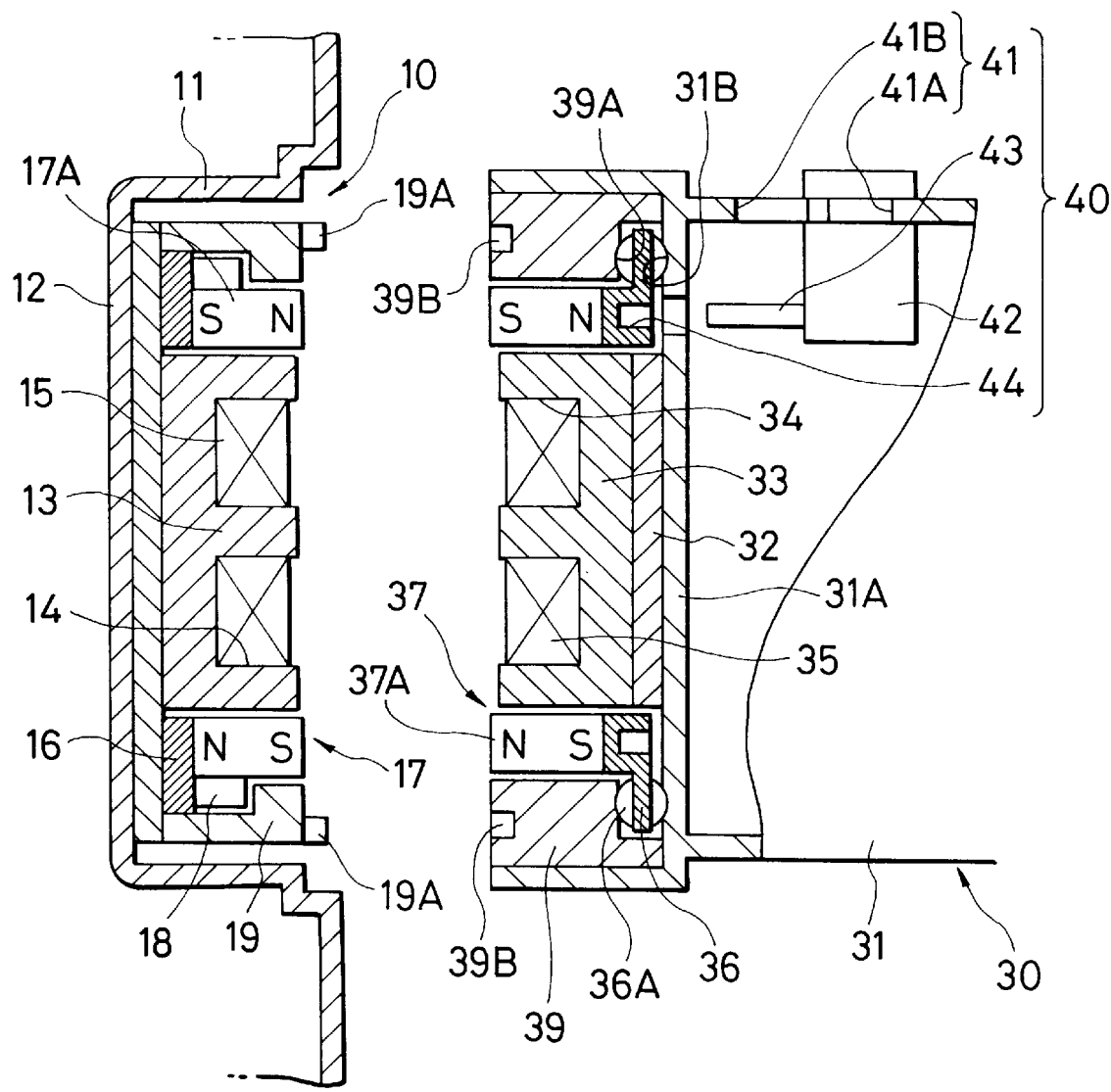
FIG. 4 is a sectional view showing a state in which a connector is detached in Embodiment 2 of the present invention.

Referring to FIGS. 1 to 3, there will subsequently be given a description of Embodiment 1 of the present invention.

A magnetic coupling apparatus for charging the power battery of an electric vehicle according to this embodiment of the present invention is an apparatus which is equipped with a vehicle-side connector 10 provided so as to fix to the body B of an electric vehicle, and connected to a power battery (not shown) mounted in the electric vehicle and a power-supply-side connector 20 connected to an external power supply (not shown) provided separately from the electric vehicle.

A connecting recess 11A ("recess" according to the present invention) is provided by making hollow the exterior surface of the body B of the electric vehicle so as to make the connecting recess 11A a connector housing 11 for a vehicle-side connector 10. A base plate 12 is fixedly installed in the connector housing 11, and a disk-like core 13 is fastened to the base plate 12. A concentric annular coil accommodating portion 14 is formed in the joint surfaces of the core 13 with respect to the power-supply-side connector 20 and a secondary coil 15 is wound on the coil accommodating portion 14.

Figure 11:
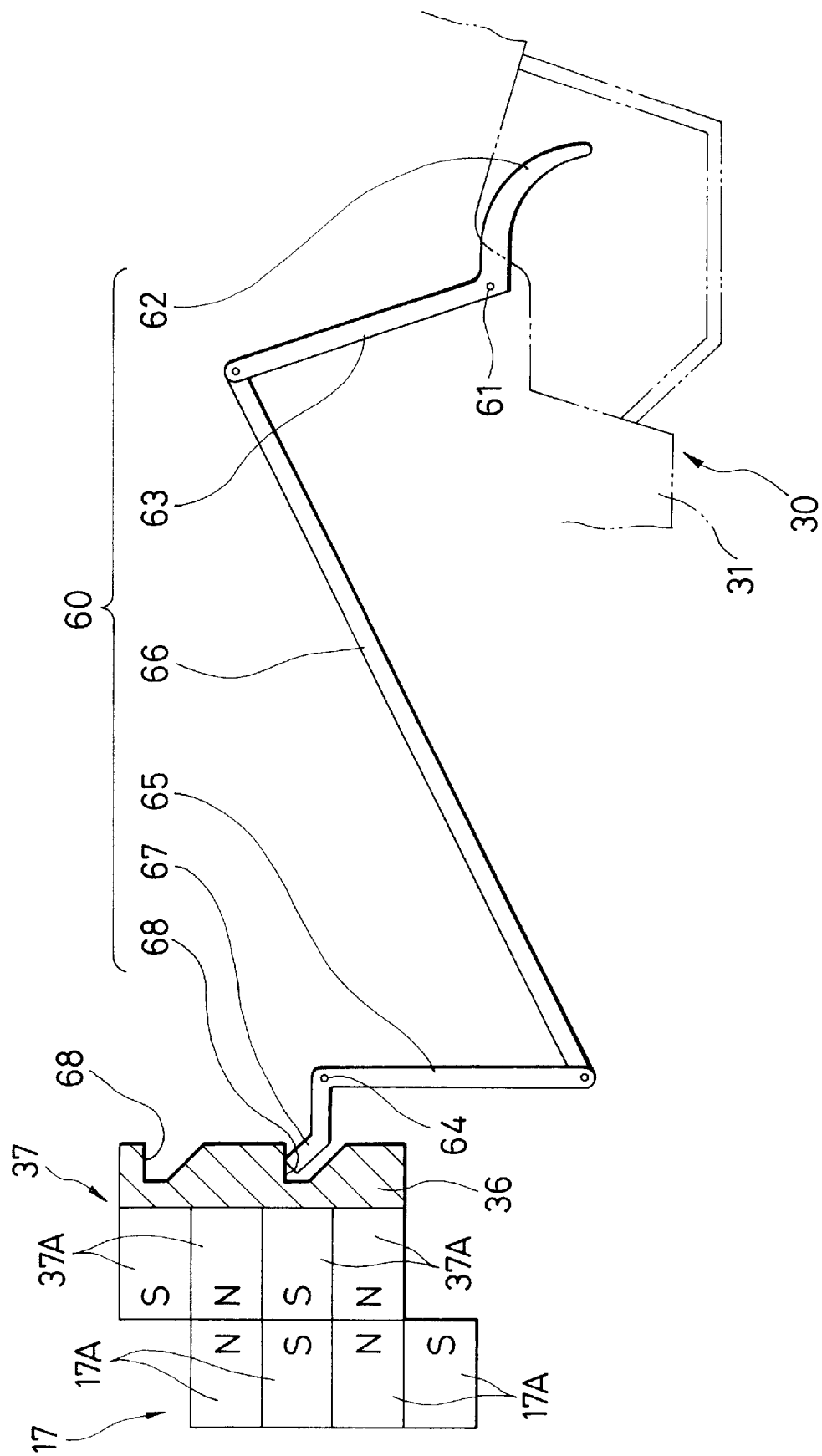
FIG. 11 is a schematic diagram illustrating a state in which magnetic repulsive force is generated between groups of magnets in Embodiment 4 of the present invention.

The joint surface of the core 13 is divided by the coil accommodating portion 14 into two sides: the central and outer joint surfaces of the core 13 and these two joint surfaces 13A, 13B (see FIG. 2) are connected to the core 23 of the power-supply-side connector 20 at the time of charging. As shown in 10; FIG. 11 the joint surfaces 13A, 13B are adapted side by side to form the same plane and directed to the open portion of the connecting recess 11A. When both cores 13, 23 are coupled together, there is formed a closed loop magnetic circuit between the secondary coil 15 and a primary coil 25 which will be described later.

A concentric annular mounting plate 16 is fixed to the peripheral edge portion of the base plate 12 in such a way as to surround the core 13, and a group of permanent magnets 17 having a plurality (16 pieces according to this embodiment of the present invention) of permanent magnets 17A are provided on the mounting plate 16. As shown in FIG. 2, the group of permanent magnets 17 are arranged so that the N and S poles of 16 pieces of permanent magnets 17A are alternately disposed in a circle with an equal-angle pitch on the one side of the core 13 facing the power-supply-side connector 20. Further, a projection 18 is formed on the outer peripheral face of each permanent magnet 17A and the group of permanent magnets 17 are fastened to the base plate 12 by pressing the projections 18 toward the base plate 12 with an annular hold-down member 19 fitted to the outer peripheral edge of the mounting plate 16.

On the other hand, the power-supply-side connector 20 is equipped with a connector housing 21 which is opened toward the vehicle-side connector 10, and a disk-like core 23 is fastened to a base plate 22 which is fixed to the connector housing 21. A concentric annular coil accommodating portion 24 is formed on one side of the core 23, which side is facing the vehicle-side connector 10, and a primary coil 15 is accommodated in the coil accommodating portion 24 in such a state that the primary coil 25 is wound thereon.

A concentric annular mounting plate 26 is fixed to the peripheral edge portion of the base plate 22 in such a way as to surround the core 23, and a group of permanent magnets 27 are provided on the mounting plate 26. Like the vehicle-side connector 10, the group of permanent magnets 27 are arranged so that the N and S poles of 16 pieces of permanent magnets 27A are alternately disposed in a circle with an equal-angle pitch on the outside of the core 23 facing the vehicle-side connector 10. The diameter of a circle on which the group of permanent magnets 27 are arranged is set equal to that of the circle on which the group of permanent magnets 17 are arranged. Further, the group of permanent magnets 27 are fixed to the base plate 22 by holding down a projection 28 formed on the outer peripheral face of the group thereof with an annular hold-down member 29.

When the power-supply-side connector 20 is fitted in the vehicle-side connector 10 by bringing both their facing sides into closer relationship, the cores 13, 23 of both connectors 10, 20 correspond to each other and so do the primary and secondary coils 25, 15. When a trigger 20T is operated in the condition above, the primary coil 25 is excited as current flows from the charging power supply to the power-supply-side connector 20 and a magnetic circuit passing through both coils 15, 25 is formed, whereby the storage battery is charged with the electromagnetic induction current generated in the secondary coil 15.

The vehicle-side connector 10 and the power-supply-side connector 20 are kept into contact with each other during the charging operation due to the magnetic attraction generated in between the heteropolar magnets in both groups of permanent magnets 17, 27. In other words, when the power-supply-side connector 20 is set closer to the vehicle-side connector 10, the magnetic attraction causes their facing sides to draw one another, and the position and posture of the power-supply-side connector 20 with respect to the vehicle-side connector 10 are corrected so that the N and S poles of the groups of permanent magnets 17, 27 face one another. The fitting operation above is completed at the time both permanent magnets 17, 27 are brought into intimate contact with one another to ensure that the power-supply-side connector 20 is kept in contact with the vehicle-side connector 10 while the free play of the former against the latter is regulated.

Since the N and S poles of the groups of permanent magnets 17, 27 thus arranged with the equal-angle pitch amount to eight (8) ways in combination, respectively, there are eight (8) kinds of postures (positions in the circumferential direction) where the power-supply-side connector 20 can be fitted in the vehicle-side connector 10. Since the circumferential posture is not restricted according to this embodiment of the present invention which utilizes the function of the electromagnetic induction, however, it is possible to charge the power-supply-side connector 20 that has been fitted in any posture.

When the power-supply-side connector 20 is detached from the vehicle-side connector 10, further, magnetic repulsive force which is generated between the homopolar magnets in both groups of permanent magnets 17, 27 is utilized. In other words, when the grip 20G of the power-supply-side connector 20 is turned in the circumferential direction concentrically with the groups of permanent magnets 17, 27 while it is being gripped, there is generated the magnetic repulsive force between the N and S poles that are facing one another in the groups of permanent magnets 17, 27, the power-supply-side connector 20 receives pushing back force from the vehicle-side connector 10, so that the former is easily detached from the latter.

As set forth above, according to this embodiment of the present invention, the magnetic attraction generated between the permanent magnets 17A, 27A causes their facing sides automatically attract one another when the power-supply-side connector 20 is fitted in the vehicle-side connector 10, whereby the fitting work is facilitated. Further, the magnetic repulsive force generated between the permanent magnets 17A, 27A is utilized when they are separated, so that improvement in the work of separating both connectors 10, 20 can also be effected.

Incidentally, the joint surfaces of both cores 13, 23 are coupled together as they constitute the closed-loop magnetic circuit at the time of charging. However, since these joint surfaces are exposed to the air while they are not used, extraneous substances may stick to the joint surfaces. As the joint surfaces 13A, 13B of the secondary coil 13 are directed to the open portion of the connecting recess 11A according to 20 this embodiment of the present invention, the joint surfaces 13A, 13B of the secondary core 13 that are not used are in such a state that they communicate with the exterior of the electric vehicle via the open portion of the connecting recess 11A. Therefore, the operator is able to find extraneous substances sticking to the joint surfaces 13A, 13B easily from the outside of the electric vehicle. As shown in FIG. 3, moreover, cleaning work can easily be done by applying cleaner to the joint surfaces from the outside of the electric vehicle. Since the joint surfaces 13A, 13B are adapted side by side to form the same plane, it is possible to clean the two joint surfaces 13A, 13B at a time by sliding a cleaner S on the same plane as shown in FIG. 3. Therefore, cleaning work can be done efficiently without the necessity of doing such cleaning work twice by changing the direction of the cleaner as before.

Extraneous substances sticking to the joint surfaces of the core of the connector according to this embodiment of the present invention can easily be found and removed through cleaning work.

A cover may be provided for the recess (connecting recess 11A) according to this embodiment of the present invention, so that no extraneous substances are allowed to enter the recess that is not used.

Embodiment 2

Referring FIGS. 3 to 6, there will subsequently be given a description of Embodiment 2 of the present invention.

Embodiment 2 of the present invention is different from Embodiment 1 thereof in that part of the structure of a vehicle-side connector in Embodiment 2 thereof is made different from what is shown in Embodiment 1 and so is the structure of a power-supply-side connector. Consequently, like reference characters are given to like structure, functions and effect of Embodiment 1 of the present invention, and the description thereof will be omitted.

The vehicle-side connector 10 in Embodiment 2 of the present invention is provided with eight (8) positioning pins (positioning units as component requirements of the present invention) 19A projecting from the hold-down member 19 on the facing sides. The positioning pins 19A are arranged with an equal-angle pitch concentrically along the group of permanent magnets 17. Since the rest of the structure of the vehicle-side connector 10 is the same as that of the vehicle-side connector 10 in Embodiment 1 of the present invention, the description thereof will be omitted.

On the other hand, a power-supply-side connector 30 is equipped with a connector housing 31 which is opened toward the vehicle-side connector 10, and a disk-like core 33 is fixed to a base plate 32 which is fixed to the partition wall 31A of the connector housing 31. A concentric annular coil accommodating portion 34 is formed on one side of the core 33, which side is facing the vehicle-side connector 10, and a primary coil 35 is accommodated in a coil accommodating portion 34 in such a state that the primary coil 35 is wound thereon.

A concentric annular mounting plate 36 is provided on the peripheral edge portion of the partition wall 31A in such a way as to surround the core 33. The mounting plate 36 is equipped with ball bearings 36A, which are mounted in such a state that the ball bearings 36A are held between the partition wall 31A and a hold-down member 39 that is fixed to the partition wall 31A, and rotated concentrically with the connector housing 31 by engaging the ball bearings 36A with guide rails 31B, 39A which are arcuate in cross section and formed concentrically with the partition wall 31A and the hold-down member 39. To the mounting plate 36, as in the vehicle-side connector 10, a group of permanent magnets 37 are fastened to the hold-down member 39, the group of permanent magnets 37 having 16 pieces of permanent magnets 37A whose N and S poles are alternately disposed in a circle with an equal-angle pitch. In other words, the group of permanent magnets 37 of the power-supply-side connector 30 are set rotatable with respect to the connector housing 31. Moreover, there are formed eight (8) positioning holes (positioning units as component requirements of the present invention) 39B, in the hold-down member 39 facing the vehicle-side connector 10, capable of matching the positioning pins 19A of the vehicle-side connector 10.

An engagement releasing unit 40 for facilitating the removal of the power-supply-side connector 30 from the vehicle-side connector 10 is also provided for the power-supply-side connector 30. The engagement releasing unit 40 includes an L-shaped guide groove 41 which is formed in the connector housing 31, a slider 42 which is fitted in the guide groove 41, retaining pins 43 which are provided for the slider 42, and retaining holes 44 which are formed in a mounting plate 36.

Figure 6:
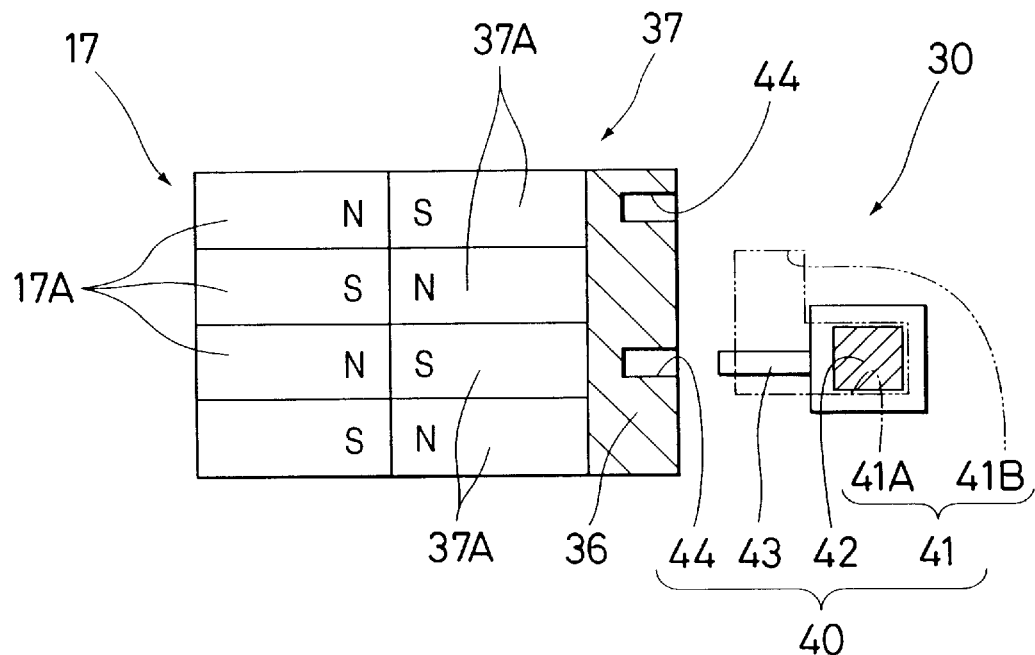
FIG. 6 is a schematic diagram illustrating a state in which magnetic attraction is generated between groups of magnets in Embodiment 2 of the present invention.
Figure 7:
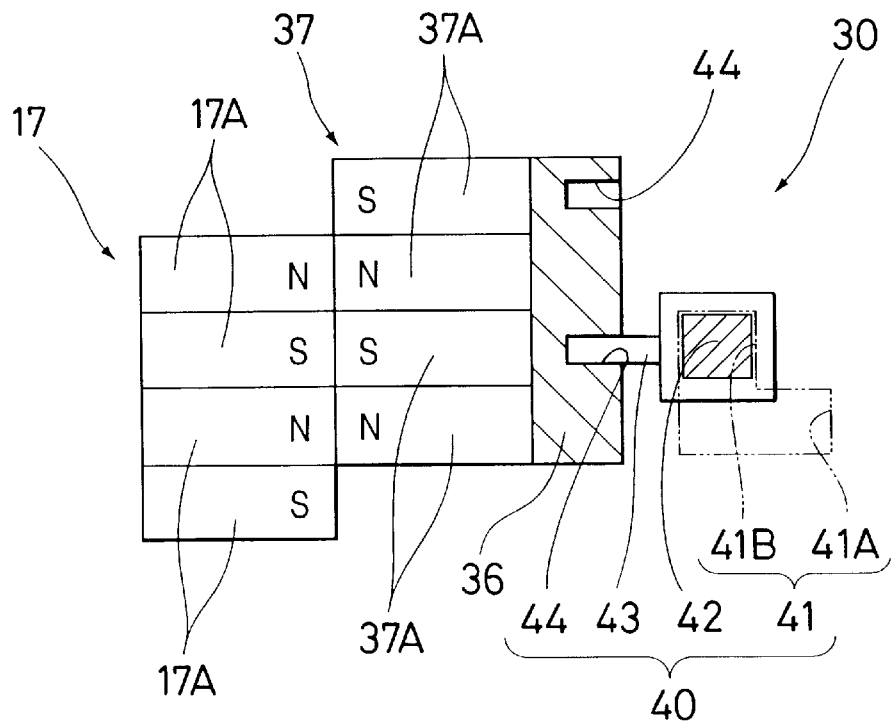
FIG. 7 is a schematic diagram illustrating a state in which magnetic repulsive force is generated between groups of magnets in Embodiment 2 of the present invention.

The guide groove 41 has a locking portion 41A and an operating portion 41B which intersect each other perpendicularly and in such a state that the slider 42 is positioned in the locking portion 41A, the retaining pins 43 are removed from the respective retaining holes 44 and become retracted so as not to interfere with the mounting plate 36 as shown in FIG. 6. When the slider 42 is moved forward up to the operating portion 41B, the retaining pins 43 are fitted in the retaining holes 44 and when the slider 42 is moved up in this state as shown in FIG. 7, the group of permanent magnets 37 of the power-supply-side connector 30 together with the mounting plate 36 are shifted by one pitch (equivalent to one permanent magnet). Further, the retaining holes 44 correspond to the alternate eight permanent magnets 37A out of the 16 permanent magnets 37A and are arranged with the equal-angle pitch, whereby the retaining pins 43 are made to face the respective retaining holes 44 when the heteropolar magnets in both groups of permanent magnets 17, 37 correspond one another.

The function according to this embodiment of the present invention will subsequently be described.

When the power-supply-side connector 30 is fitted in the vehicle-side connector 10, the slider 42 is positioned in the locking portion 41A beforehand and in this state, the power-supply-side connector 30 is set closer to the vehicle-side connector 10 so as to fit the positioning pins 19A in the respective positioning holes 39B. Thus, both connector housings 11, 31 are properly positioned and their relative floating on facing sides are regulated. When the positioning pins 19A and the positioning holes 39B are fitted together, the N and S poles of the group of permanent magnets 37 of the power-supply-side connector 30 are turned and caused to face the S and N poles of the group of permanent magnets 17 of the vehicle-side connector 10. Since the positioning pins 43 are off the respective positioning holes 44 at this time, the positioning pins 43 are prevented from interfering with the rotation of the group of permanent magnets 37. When the power-supply-side connector 30 is fitted in the vehicle-side connector 10, the magnetic attraction generated in between both groups of permanent magnets 17, 37 keeps both connectors 10, 30 fitting each other.

As the positioning pins 19A and the positioning holes 39B are arranged with the equal-angle pitch when the power-supply-side connector 30 is fitted in, there are eight ways of positioning the power-supply-side connector 30 with respect to the vehicle-side connector 10. Since the group of permanent magnets 37 of the power-supply-side connector 30 are freely rotatable, however, the heteropolar magnets in both groups of permanent magnets 17, 37 are allowed to correspond one another in any arrangement and the magnetic attraction generated in this state has both connectors 10, 30 fitted together with ease.

Figure 5:
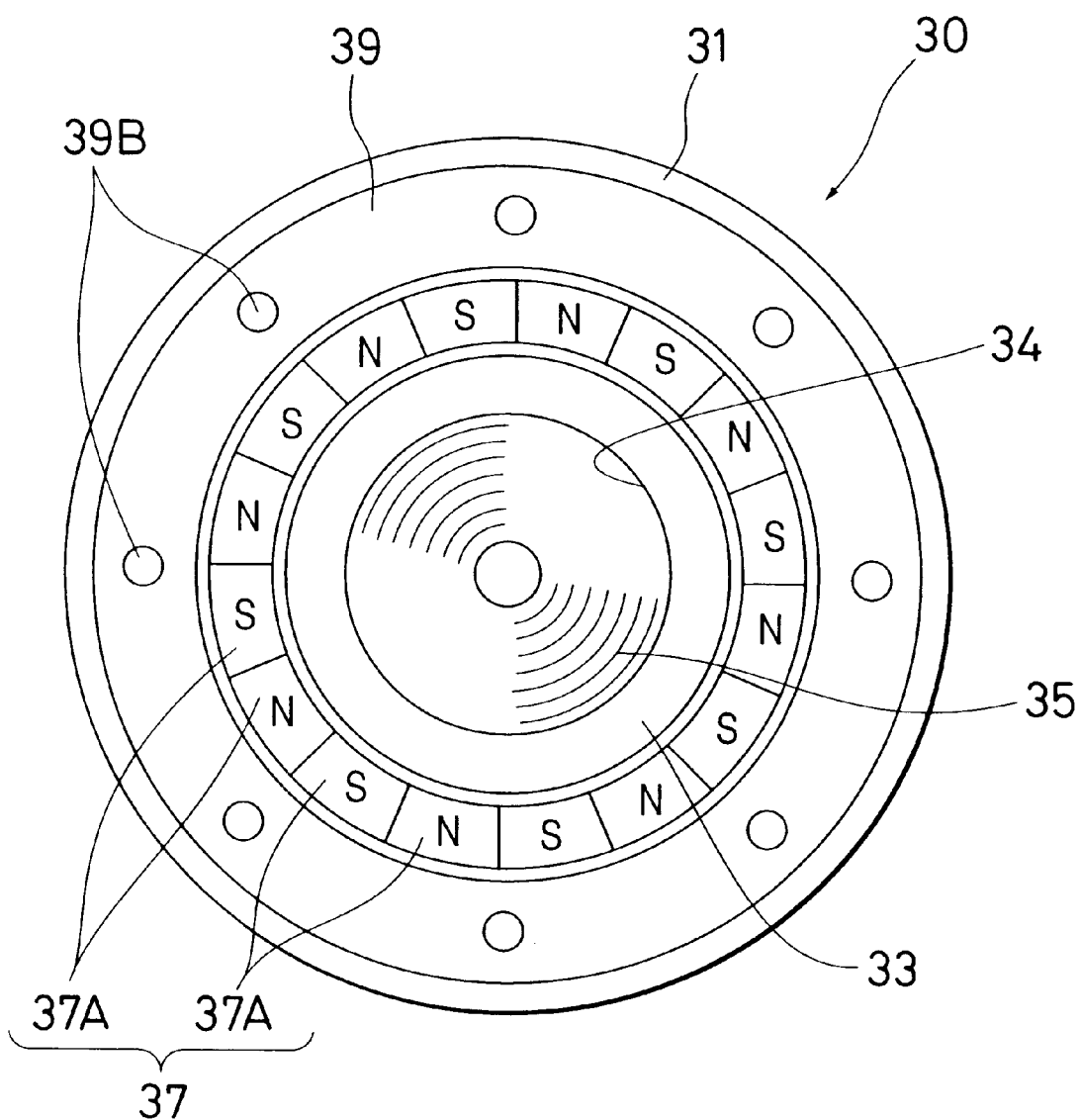
FIG. 5 is an elevational view of a power-supply-side connector in Embodiment 2 of the present invention.

When the power-supply-side connector 30 is detached from the vehicle-side connector 10, the slider 42 is moved from the locking portion 41A to the operating portion 41B to have the retaining pins 43 fitted in the retaining holes 44 and then the slider 42 is moved upward of FIG. 5 within the operating portion 41B. Since the group of permanent magnets 37 of the power-supply-side connector 30 together with the slider 42 are moved upward by one pitch, the permanent magnets 37A, 17A having the homopolar in both power-supply-side connector 30 and vehicle-side connector 10 correspond to one another. Thus, there is generated the magnetic repulsive force between both groups of permanent magnets 17, 37 and the power-supply-side connector 30 receives pushing back force from the vehicle-side connector 10, so that the former is easily detached from the latter.

Embodiment 3

Referring FIGS. 8 and 9, there will subsequently be given a description of Embodiment 3 of the present invention.

In Embodiment 3 of the present invention, the engagement releasing unit is made different from what is shown in Embodiment 2 thereof and the rest of the structure is the same as that in Embodiment 2 thereof. Consequently, like reference characters are given to like structure, functions and effect of Embodiment 2 of the present invention, and the description thereof will be omitted.

An engagement releasing unit 50 in Embodiment 3 of the present invention includes a linear guide groove 51 which is formed in the connector housing, a slider 52 which is fitted in the guide groove 51, a driving cam 53 which is provided for the slider 52, and driven cams 54 which is provided for the mounting plate 36. The driven cams 54 correspond to eight alternate permanent magnets 37A out of the 16 permanent magnets 37A and are arranged at equal-angle intervals, so that the driving cam 53 corresponds to any one of the driven cams 54 when the heteropolar magnets in both groups of permanent magnets 17, 37 correspond to one another. The driving cam 53 and the driven cams 54 each have cam faces 53A, 54A which tilt in the rotational direction of the group of permanent magnets 37 of the power-supply-side connector 30.

Figure 8:
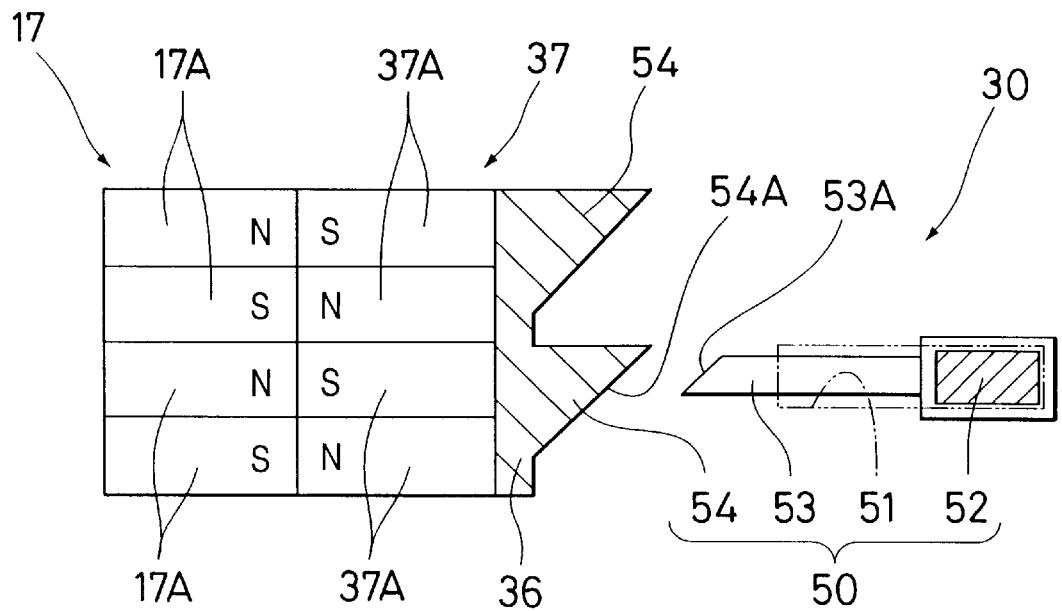
FIG. 8 is a schematic diagram illustrating a state in which magnetic attraction is generated between groups of magnets in Embodiment 3 of the present invention.
Figure 9:
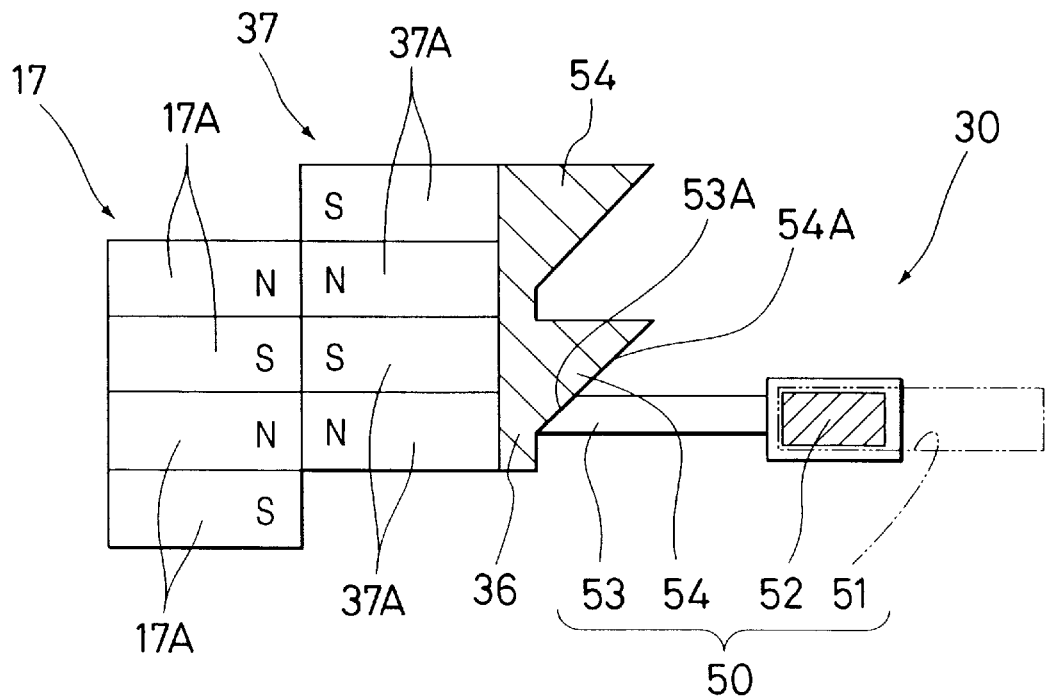
FIG. 9 is a schematic diagram illustrating a state in which magnetic repulsive force is generated between groups of magnets in Embodiment 3 of the present invention.

When the power-supply-side connector 30 is fitted in the vehicle-side connector 10, the slider 52 becomes retracted as shown in FIG. 8 and the tip of the driving cam 53 is so positioned as not to interfere with the driven cams 54, whereby the rotation of the group of permanent magnets 37 are set free from being impeded.

When the power-supply-side connector 30 is detached, the slider 52 is pushed forward along the guide groove 51. Then the cam face 53A of the driving cam 53 mates with the cam face 54A of the driven cams 54, and the tilted cam faces 53A, 54A push the mounting plate 36. The group of permanent magnets 37 are shifted by one pitch as shown in FIG. 9 and the homopolar magnets in both groups of permanent magnets 17, 37 correspond one another. The magnetic repulsive force generated in between both the groups has the power-supply-side connector 30 detached with ease.

Embodiment 4

Referring FIGS. 10 and 11, there will subsequently be given a description of Embodiment 4 of the present invention.

In Embodiment 4 of the present invention, the engagement releasing unit is made different from what is shown in Embodiment 2 thereof and the rest of the structure is the same as that in Embodiment 2 thereof. Consequently, like reference characters are given to like structure, functions and effect of Embodiment 2 of the present invention, and the description thereof will be omitted.

An engagement releasing unit 60 in Embodiment 4 of the present invention includes a trigger 62 which is fitted to the connector housing 31 and capable of rocking operation by means of a support shaft 61, a driving link 63 which is capable of rotation together with the trigger 62 and extended in the opposite direction of the support shaft 61, an L-shaped driven link 65 which is disposed between the driving link 63 and the group of permanent magnets 37 and made rotatable by a support shaft 64, a coupling link 66 for coupling the tip of the driving link 63 to one end of the driven link 65, a retaining pawl 67 which is formed at the other end of the driven link 65, and a retaining recess 68 which is formed in the mounting plate 36.

Figure 10:
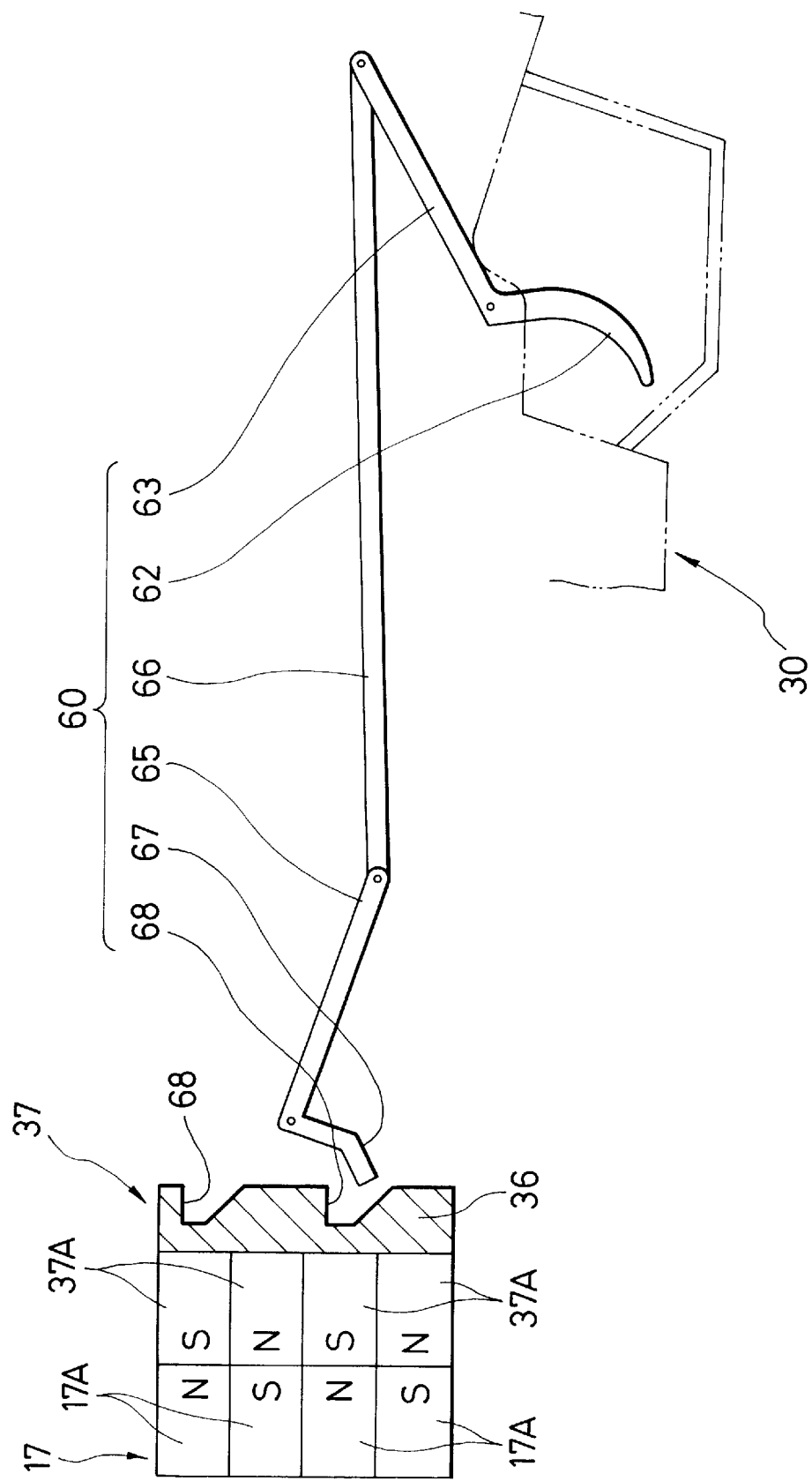
FIG. 10 is a schematic diagram illustrating a state in which magnetic attraction is generated between groups of magnets in Embodiment 4 of the present invention.

When the power-supply-side connector 30 is fitted in, the trigger 62 is in a prior-to-operating position, and the retaining pawl 67 of the driven link 65 is released from the retaining recess 68 and set free from interfering with the mounting plate 36 as shown in FIG. 10, whereby the group of permanent magnets 37 is made rotatable without any obstacle.

When the power-supply-side connector 30 is detached, the trigger is pulled. Then the driving link 63 rotates counterclockwise in FIG. 10 and the coupling link 66 is pushed to the left in FIG. 10, thus causing the driven link 65 to rotate clockwise. With the rotation of the driven link 65, the retaining pawl 67 is fitted in the retaining recess 68 and pushes the retaining recess 68 upward in FIG. 11, and the group of permanent magnets 37 are shifted by one pitch. The homopolar magnets in both groups of permanent magnets 17, 37 correspond one another and the magnetic repulsive force generated in between both the groups has the power-supply-side connector 30 detached with ease.

Embodiment 5

FIGS. 12 to 15 show Embodiment 5 of the present invention wherein the structure of magnets for use in bringing both connectors into engagement with each other is different from what is shown in Embodiment 1 of the present invention.

Figure 12:
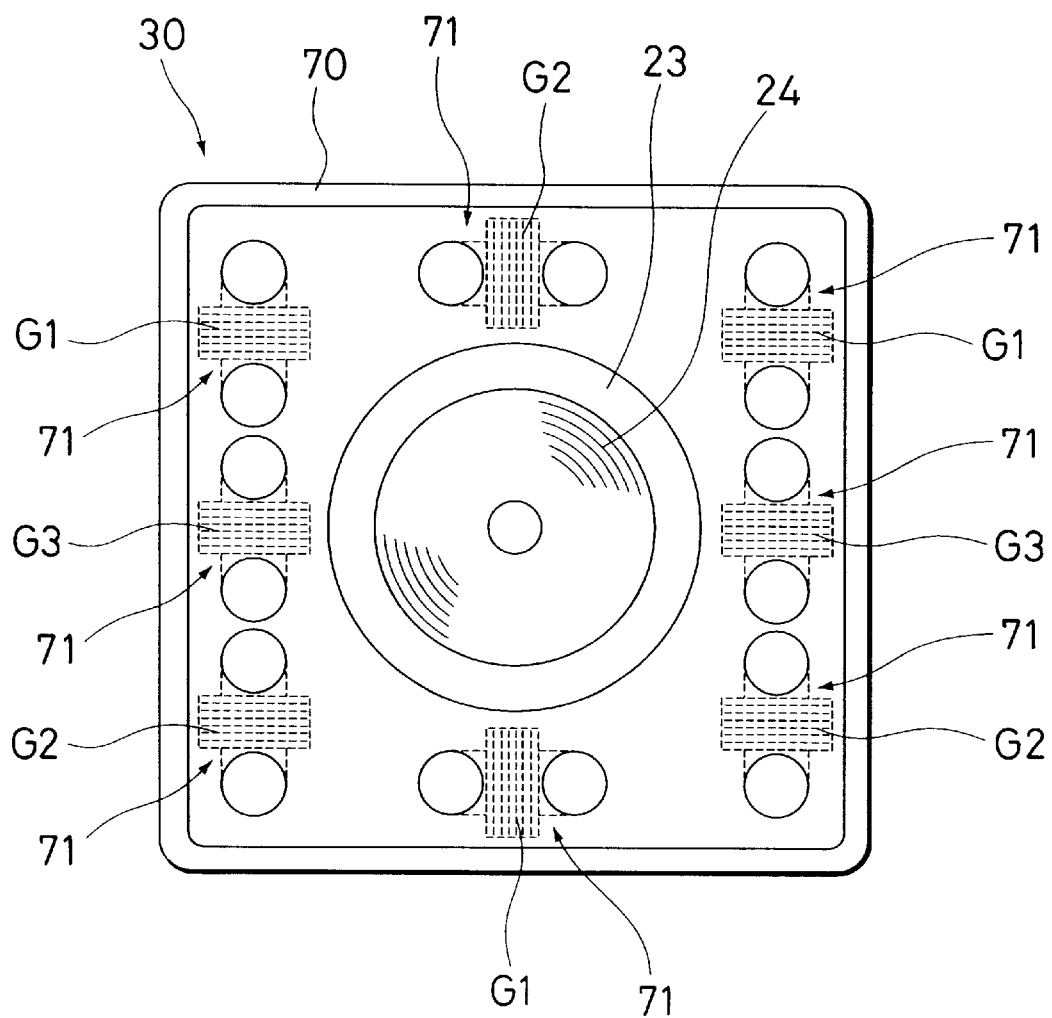
FIG. 12 is an elevational view of a power-supply-side connector in Embodiment 5 of the present invention.

A connector housing 70 of the power-supply-side connector 30 according to this embodiment of the present invention is rectangular as shown in FIG. 12. In the center of the rectangle is the same core 23 as that in Embodiment 1 of the present invention and a plurality of connector holding magnets 71 are arranged in the peripheral edge portion. The connector holding magnet 71 is an electromagnet such that, as shown in FIG. 14, a coil 73 is wound in the intermediate portion of a ferrite core 72 which is formed by bending a round bar into an angular C-shape and mounted in the connector housing 70 so that both edge faces 74, 74 of the magnetic core 72 and the core 23 are leveled (see FIG. 13). In this case, a slide switch 75 (see FIG. 13) installed on the back of a grip 20G is used for switching an excitation state over to a non-excitation state and vice versa.

The plurality of connector holding magnets 71 are arranged as shown in FIG. 12 so that three of them are disposed along both lateral sides of the rectangular connector housing 70 and each one of them is also disposed in the center of upper and lower sides thereof. When the excitation state is switched to the non-excitation state, these connector holding magnets 71 are divided into three groups and released from the excitation state successively in order. More specifically, the first group (see symbol G1 of FIG. 12) consists of the magnets on both upper end sides and the central lower side of the connector housing 70; the second group (see symbol G2 of FIG. 12) consists of the magnets on both lower end sides and the central upper side thereof; and the third group (see symbol G3 of FIG. 12) consists of the magnets in the centers of both lateral sides. When the slide switch 75 is turned off, the timer attached to a power supply operates to cut off the voltage applied to the coil 73 of each electromagnet in the order of the first, second and third groups at predetermined time intervals according to a timing chart of FIG. 15(B). Thus, the excitation is released.

Figure 13:
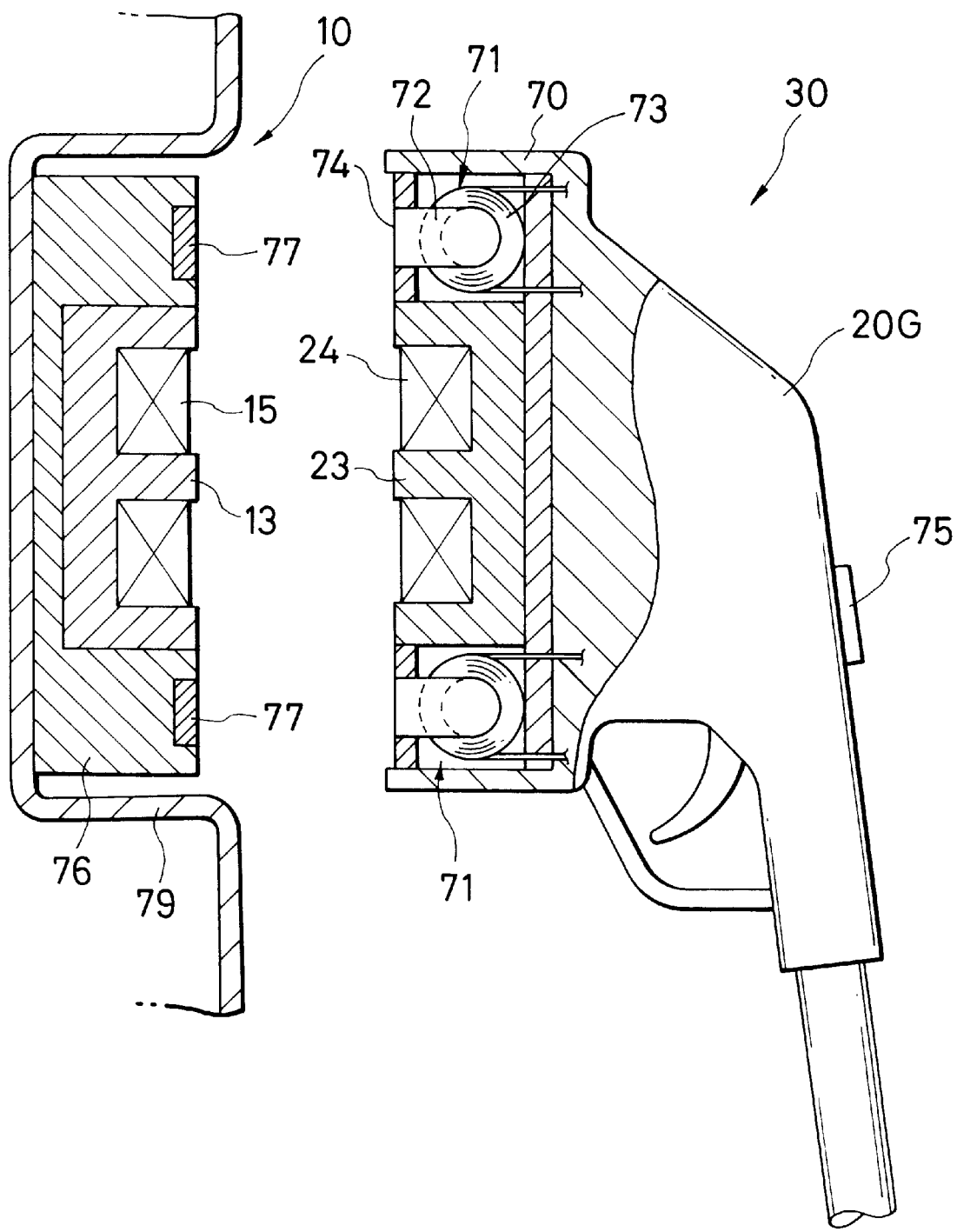
FIG. 13 is a sectional view showing a state in which a power-supply-side connector is detached from a vehicle-side connector.
Figure 14:
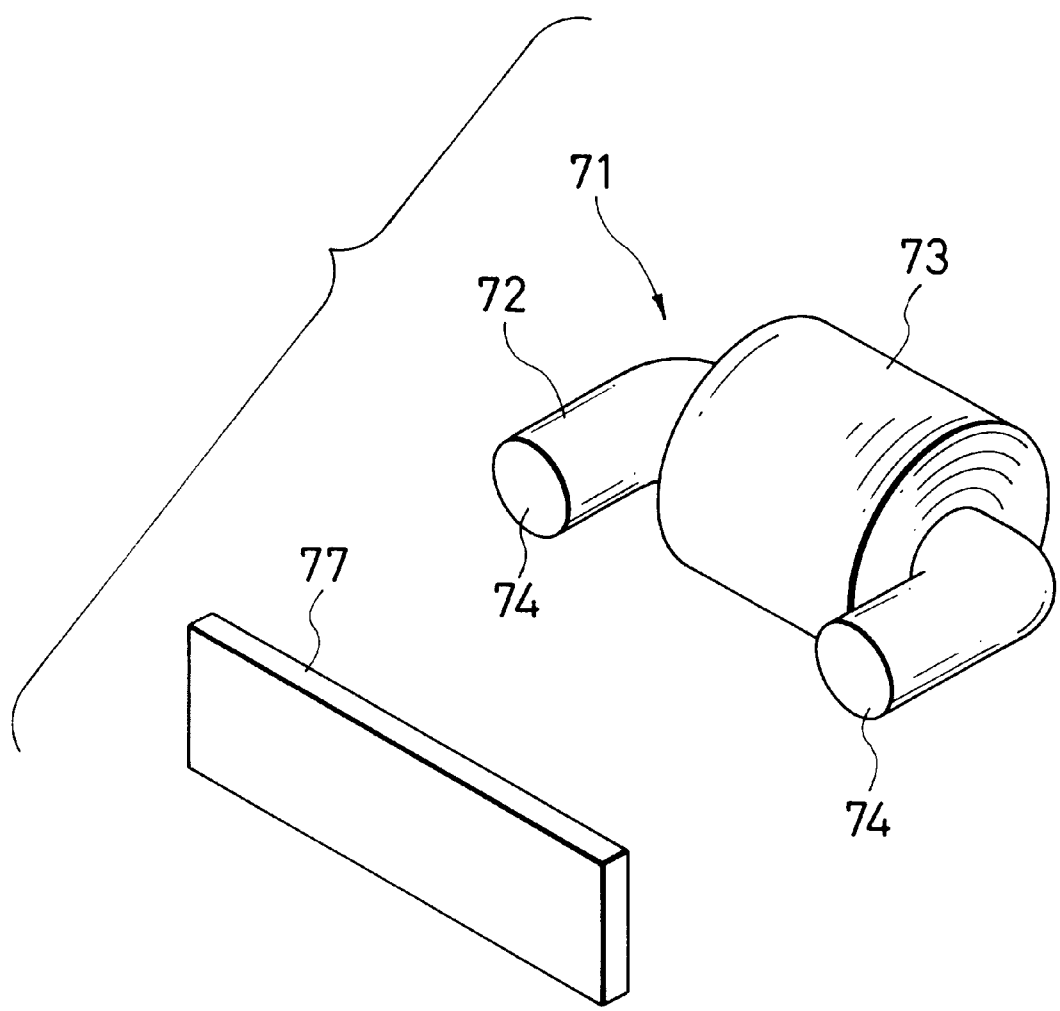
FIG. 14 is a perspective view of a connector holding magnet.

On the other hand, the vehicle-side connector is equipped with a rectangular base portion 76 inside a rectangular connector housing 79 corresponding to the aforementioned connector housing 70 (see FIG. 13). In the center of the base portion 76 is the same core 13 as that in Embodiment 1 of the present invention and a plurality of metal plates 77 (corresponding to the magnetic material according to the present invention) are mounted on portions facing the connector holding magnets 71 out of the base portion 76. When the power-supply-side connector 30 is fitted in the vehicle-side connector 10, the metal plates 77 are joined in such a way as to crosslink both end portions of the connector holding magnets 71 (see FIG. 14). Since the remaining structure is the same as what is shown in Embodiment 1 of the present invention, the description thereof will be omitted.

The functions and effect of this embodiment of the present invention are as follows:

When charging work is done, the power-supply-side connector 30 is joined to the vehicle-side connector 10 and the slide switch 75 is turned on. Since the whole connector holding magnets 71 is excited and attracts the metal plate 77, the connectors are kept into engagement with each other even thought the operator loosens his hold of the grip 20G, whereby the power-supply-side connector 30 is prevented from being inadvertently detached from the vehicle-side connector 10 during the charging operation.

Figure 15A:
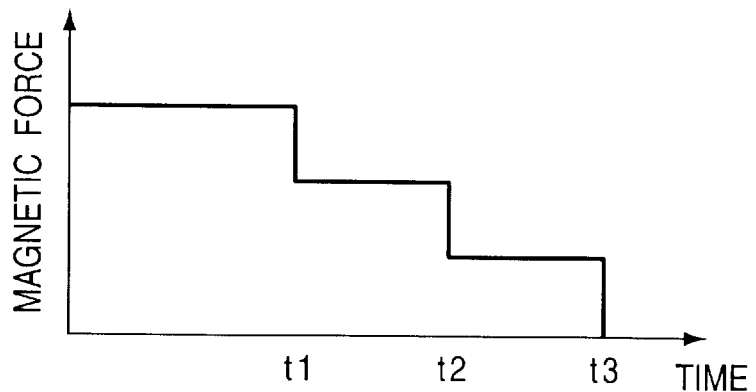
FIGS. 15A and 15B are timing charts showing variations in excitation state.
Figure 15B:
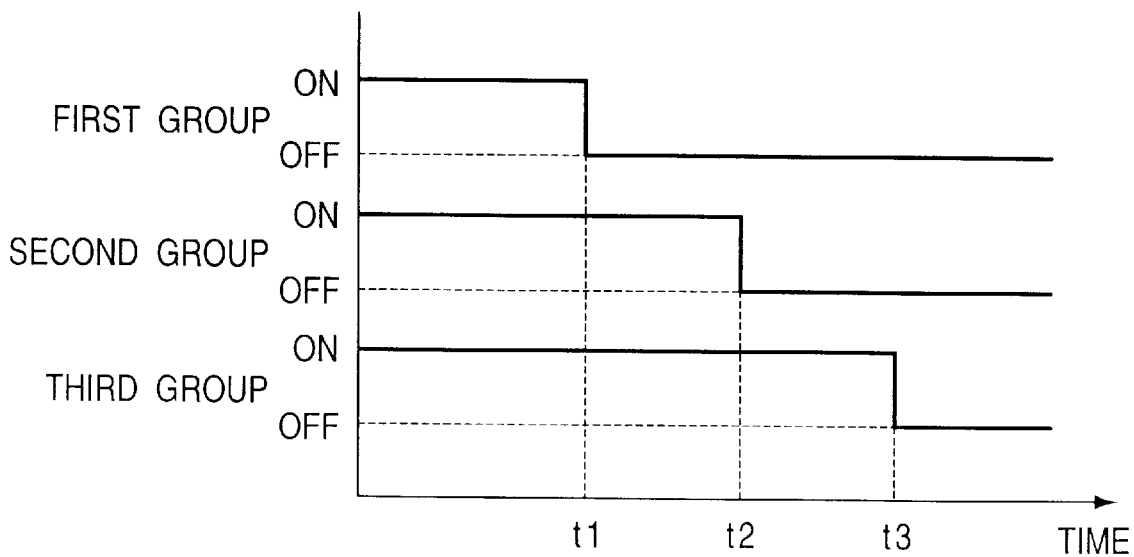

In order to detach the power-supply-side connector 30 after the termination of the charging operation, the slide switch 75 is turned off. Then the plurality of connector holding magnets 71 are released from the magnetic force in the order of the first, second and third groups as shown in FIG. 15(B) and as this process proceeds, the attractive force between both connectors 10, 30 is gradually weakened as shown in FIG. 15(A). Then the weight load of the connector 10 is gradually increased on the part of the operator holding the grip 20G, whereby the detaching operation is smoothly performed as the preparation of detaching the power-supply-side connector can be made.

Embodiment 6

Figure 16:
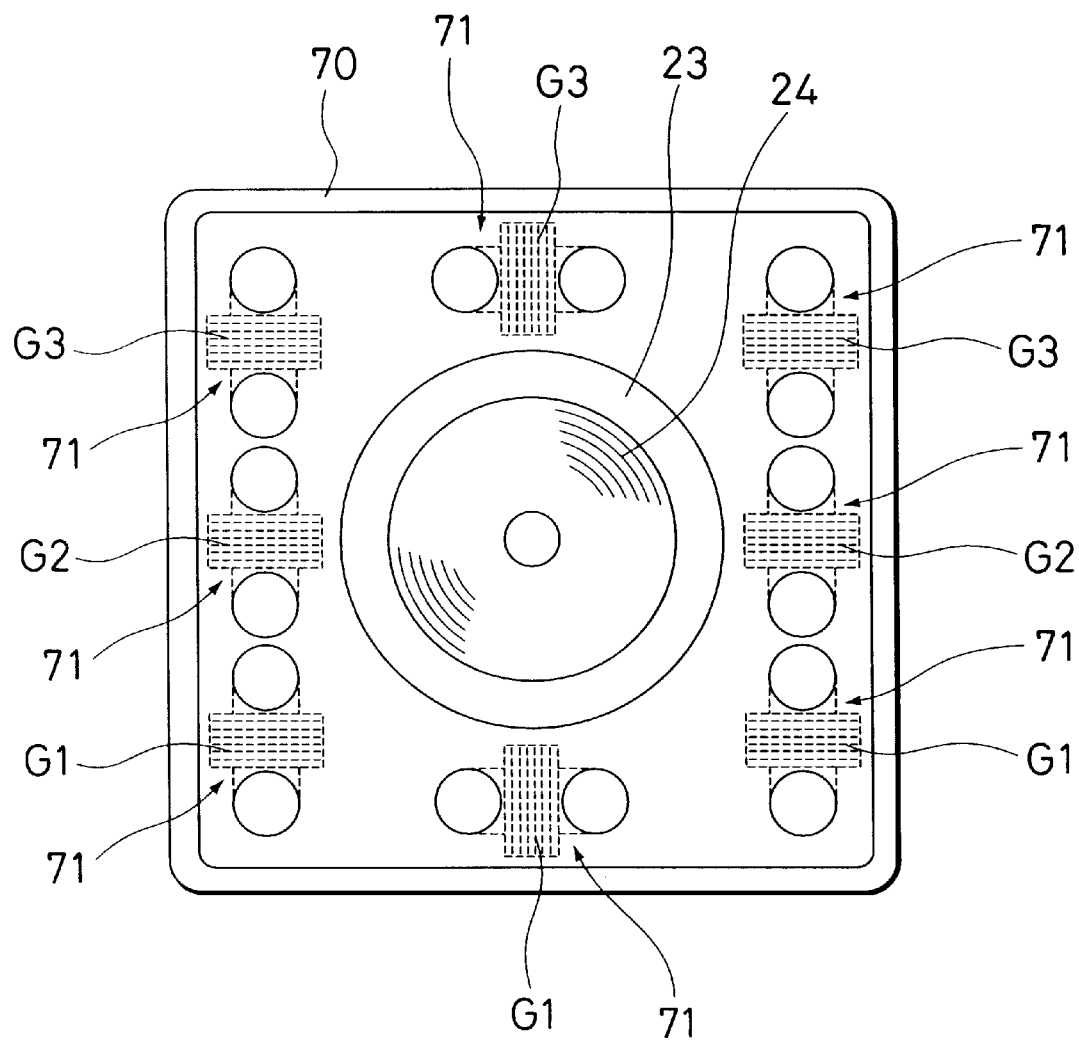
FIG. 16 is an elevational view of a power-supply-side connector in Embodiment 6 of the present invention.

The process of releasing excitation that is to be performed by the connector holding magnets 71 according to this embodiment of the present invention is different from what has been described in Embodiment 5 of the present invention and points of difference are as follows:

The connector holding magnets 71 according to this embodiment of the present invention are released from excitation on a three group basis as shown in FIG. 16. More specifically, a first group (see symbol G1 of FIG. 16) consists of three magnets in the lower portion of the connector housing 70; a second group (see symbol G2 of FIG. 16) consists of two magnets in both side portions; and a third group (see symbol G3 of FIG. 16) consists of three magnets in the upper portion. When the slide switch 75 is turned off, the timer attached to the power supply operates to cut off the voltage applied to the coil 73 of each electromagnet in the order of the first, second and third groups at predetermined time intervals. Thus, the excitation is released. Since the power-supply-side connector 30 can be detached from the vehicle-side connector 10 successively from the lower portion of the joint surface toward the upper portion, the operator is allowed to do the work of detaching the former from the latter smoothly as if he gradually peels off the former without receiving the load which suddenly increases.

When the connectors are joined together, the connector holding magnets 71 are successively excited in the order of the third, second and first groups so that both connectors may be joined successively.

Embodiment 7

Figure 17:
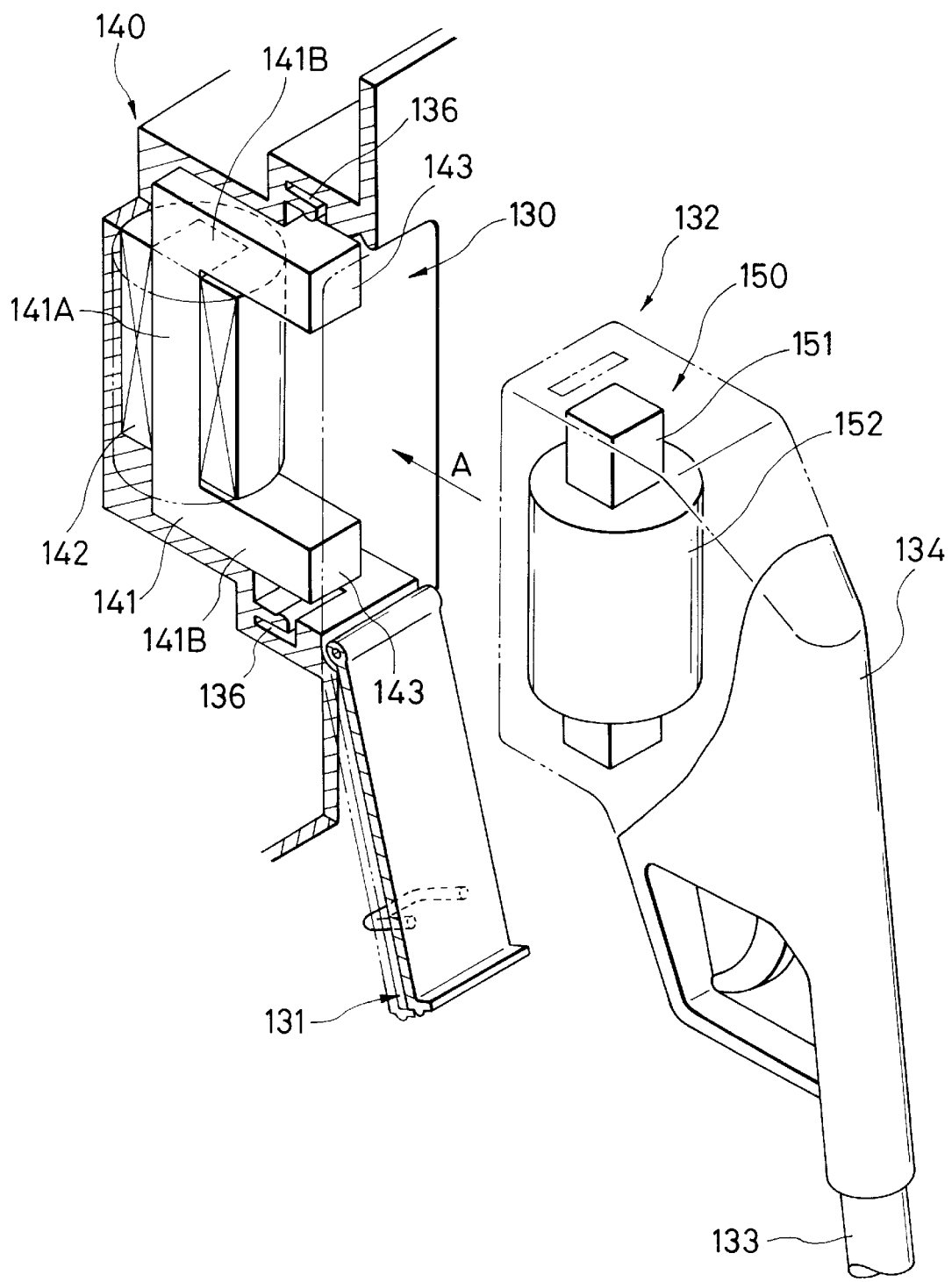
FIG. 17 ia a perspective view of a charging apparatus in Embodiment 7 of the present invention.
Figure 18:
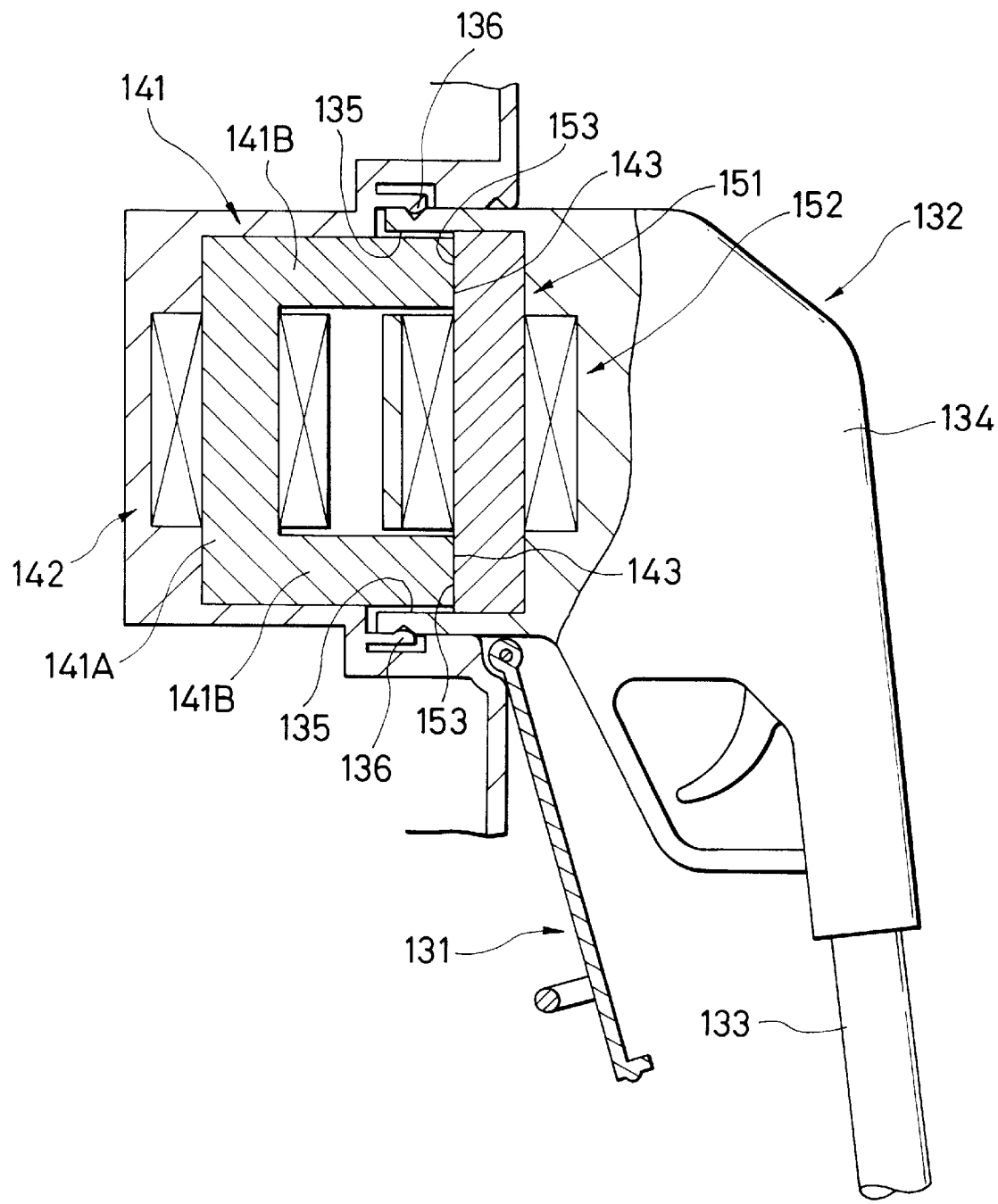
FIG. 18 is a side sectional view showing a state in which the charging apparatus has coupled in Embodiment 7 of the present invention.
Figure 19:
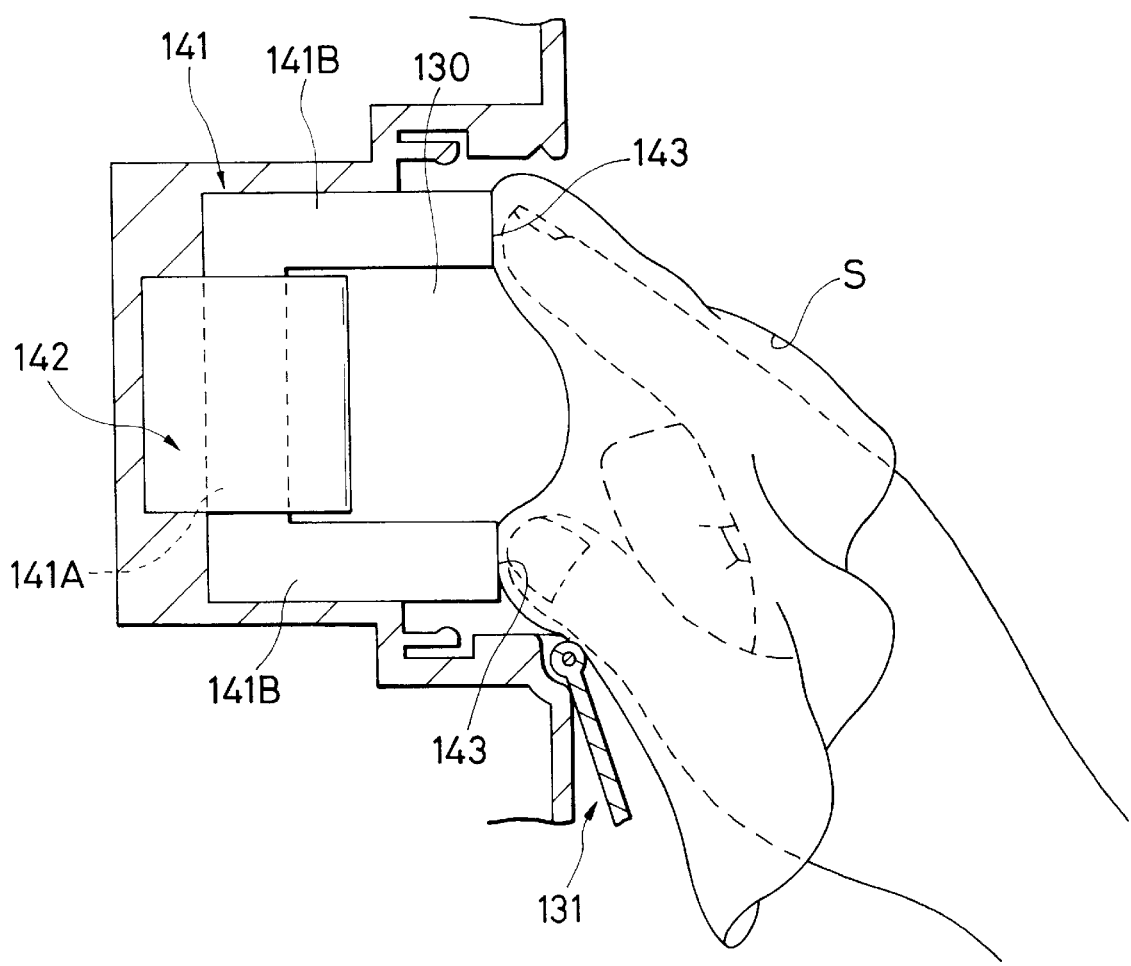
FIG. 19 is a side sectional view showing a situation in which the work of cleaning the core is being done according to Embodiment 7 of the present invention.

In Embodiment 7 of the present invention, referring to FIGS. 17 to 19, a recess which is provided with a cover and a core different in type from the core in Embodiment 1 of the present invention are shown by way of example.

A receptacle 130 ("recess" according to the present invention) outwardly opened is formed in the exterior surface of the body of an electric vehicle and the opening can be opened and closed with a cover 131 and besides a secondary coil unit 140 is placed therein. Further, a coupler 132 attached to one end of a charging power cable 133 extended from an external charging apparatus (not shown) can be fitted in along an arrow A of FIG. 17.

A secondary coil unit 140 is formed by winding a secondary coil 142 on a secondary core 141 of ferrite, for example, and the output terminal of the secondary coil 142 is connected to a charging circuit for charging a power battery (not shown) as the power battery of an electric vehicle, so that the power battery can be charged by rectifying the high-frequency electromotive force in the secondary coil 142.

The secondary core 141 is formed by, for example, bending a quadrangular prism into an angular C-shape and the secondary coil 142 is wound on the vertical side 141A of the C-shape, and the opposed sides 141B, 141B horizontally extending forward from the respective ends of the vertical side 141A have the same length. The front edge faces of the opposed sides 141B, 141B form joint surfaces 143, 143 with respect to the primary core 151 which will be described later and are mutually positioned on the same plane and also directed to the open portion of the receptacle 130.

The coupler 132 is equipped with a housing 134 which is insertable in the receptacle 130 and contains a primary coil unit 150 including a primary coil 152 and a primary core 151. The primary core 151 is I-shaped and its forward-turned sides out of both end sides form joint surfaces 153, 153 (see FIG. 18) with respect to the secondary core 141 and the primary coil 152 is wound on a place closer to the central part than the joint surfaces 153, 153. One end of the primary coil 152 is connected to the charging power cable 133.

A through-hole 135 (see FIG. 18) is formed in a portion opposite to the joint surface 153 of the primary core 151 out of the joint surfaces of the housing 134 and when the coupler 132 is inserted in the receptacle 130, the opposed sides 141B of the secondary core 141 are introduced into the housing 134 via the through-hole 135 and further both joint surfaces 143, 153 are brought into contact with each other. Thus, a closed loop magnetic circuit by means of both cores 141, 151 are formed and when the primary coil 152 is excited through the charging power cable 133, electromotive force is generated in the secondary coil 142, whereby the power battery of an electric vehicle is charged.

In this case, the open edge portion of the receptacle 130 is provided with a lock portion 136 for mechanically locking the primary coil unit 150 in the receptacle 130 in order to prevent the primary coil unit 150 from inadvertently falling away.

Embodiment 7 of the present invention is thus constituted and functions as follows:

The cover 131 is normally closed to prevent extraneous substances from entering the receptacle 130. When the cover 131 is opened for charging purposes, the receptacle 130 is made open. At this time, the joint surfaces 143, 143 of the secondary core 141 are directed to the open portion of the receptacle 130, they communicate with the outside of the electric vehicle via the open portion of the receptacle 130. Therefore, as in Embodiment 1 of the present invention, extraneous substances sticking to the joint surfaces 143, 143 of the secondary core 141 can easily be found and removed through cleaning work (see FIG. 19).

The charging operation is performed in normal condition with the joint surfaces 143, 143 free from any extraneous substances. On the termination of the charging operation, the cover 131 is closed to stop extraneous substances from entering the receptacle 130.

According to this embodiment of the present invention, it is thus possible to ensure the effect of preventing extraneous substances from sticking to the joint surfaces 143, 143 of the secondary core 41 while it is not used by providing the cover 131 for the receptacle 130 in addition to the functions and effect of Embodiment 1 of the present invention.

Embodiment 8

Figure 20:
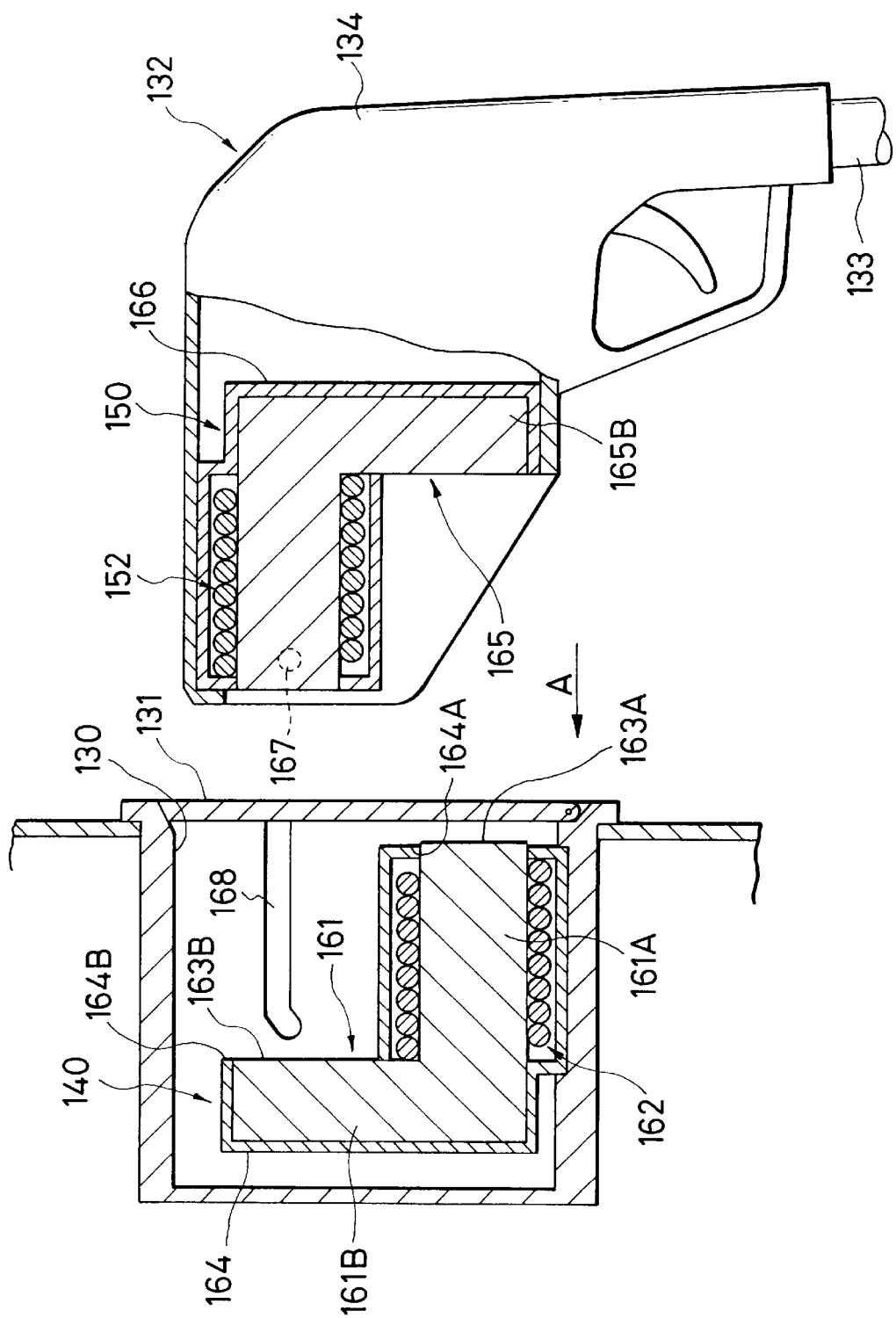
FIG. 20 is a side sectional view of a charging apparatus in Embodiment 8 of the present invention.
Figure 21:
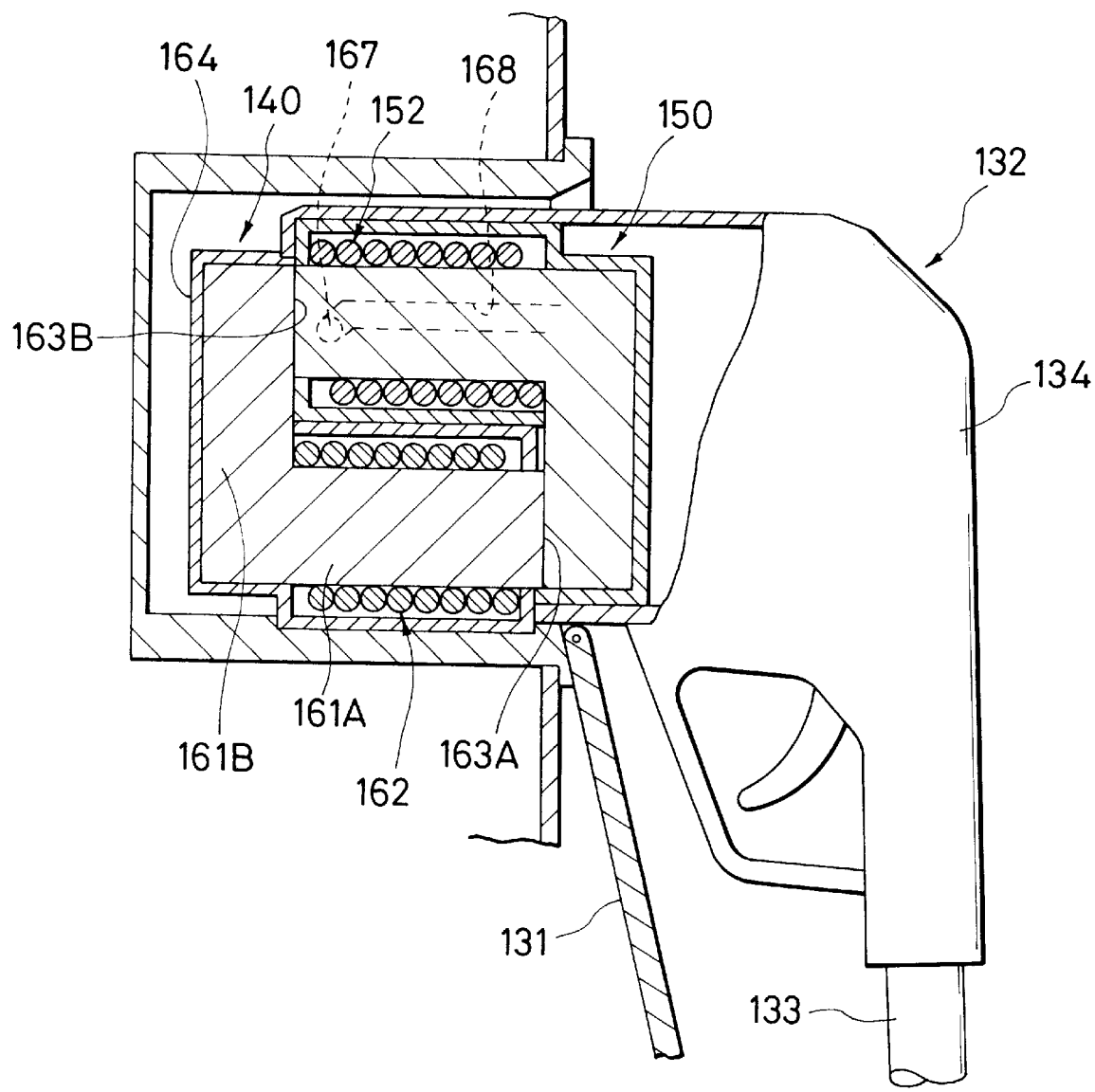
FIG. 21 ia a side sectional view showing a state in which the charging apparatus has coupled in Embodiment 8 of the present invention.
Figure 22:
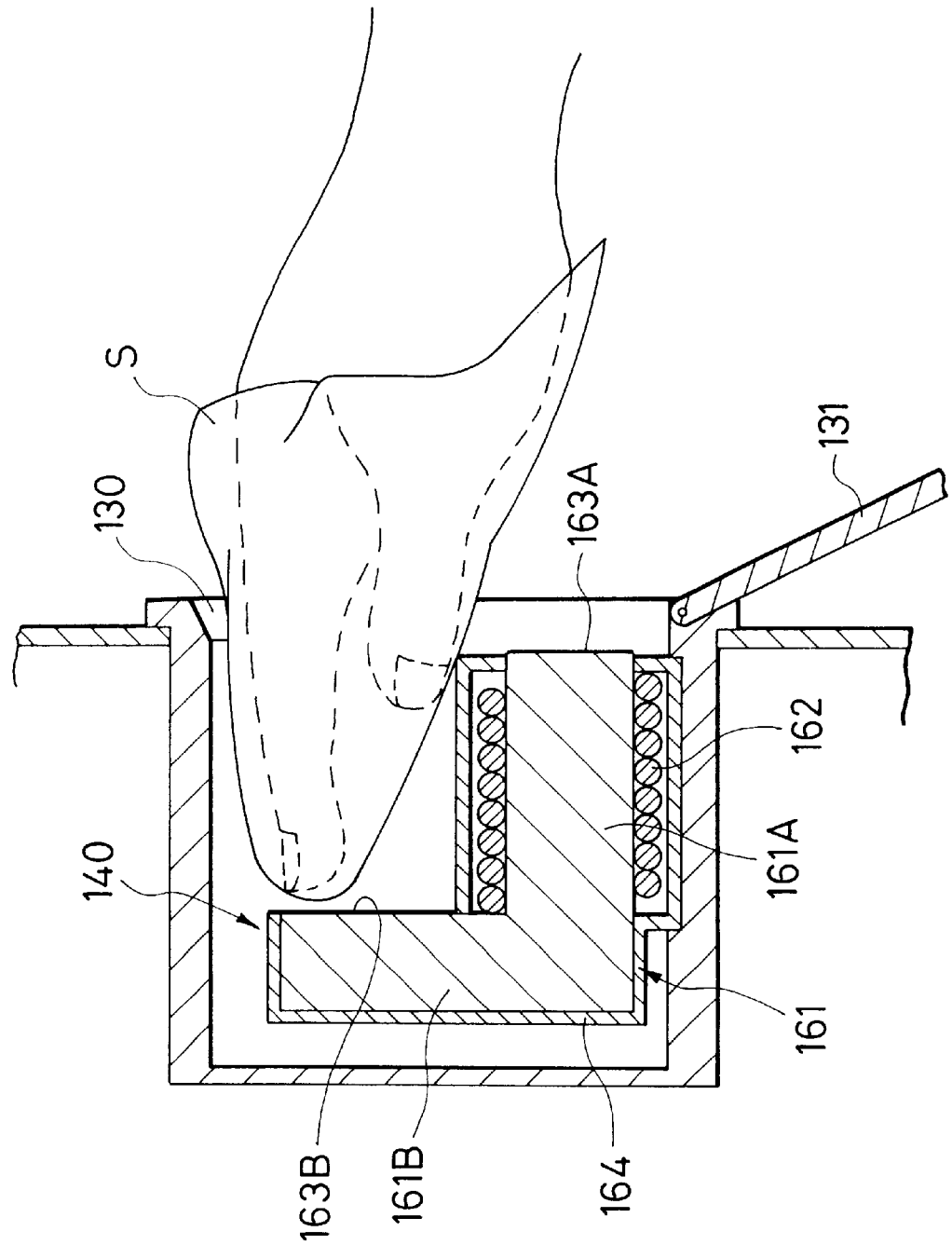
FIG. 22 is a side sectional view showing a situation in which the work of cleaning the core is being done according to Embodiment 8 of the present invention.

The Embodiment 8 of the present invention is shown in FIGS. 20 to 22. Although it has been arranged that the joint surfaces of the secondary core are adapted side by side to form the same plane in Embodiments 1, 7, the joint surfaces are not necessarily formed on the same plane and in Embodiment 8 of the present invention, the joint surfaces of the secondary core are not formed on the same plane. Like reference characters are given to like structure, functions and effect of Embodiment 7 of the present invention, and the description thereof will be omitted.

A secondary core 161 according to this embodiment of the present invention is L-shaped in side view as shown in FIG. 20 and one side of the L-shape along the horizontal direction of FIG. 20 becomes a cylindrical portion 161A which is circular in transverse cross section, whereas the other side of the L-shape perpendicularly intersecting the one side becomes a prism portion 161B which is square in transverse cross section. The secondary core 161 with a secondary coil 162 wound on the cylindrical portion 161A is contained in a plastic protective case 164, which is also fixedly contained in the receptacle 130. Further, the front edge face of the cylindrical portion 161A of the secondary core 161 and the side face of the prism portion 161B directed in the same direction that the front edge face is directed form joint surfaces 163A, 163B and are exposed in the open portion of the receptacle 130 via openings 164A, 164B formed in the protective case 164.

On the other hand, the primary coil unit 150 is formed like the secondary coil unit 140 and contained in a protective case 166 similar in shape to the protective case 164 and also fixedly contained in the housing in such a state that the prism portion 165B of the primary core 165 is directed downward in FIG. 20. When the coupler 132 is mounted in the receptacle 130, the joint surface of the cylindrical portion of each core and the joint surface of the prism portion of the opposed core are coupled, whereby a closed loop magnetic circuit is formed.

Further, a guide projection 167 is formed on both lateral sides closer to the front end of the housing 134 and guide grooves 168 corresponding to both guide projections 167 are formed in the respective inner side faces of the receptacle 130, so that the coupler 132 is guided to a proper position within the receptacle 130.

According to this embodiment of the present invention, since the joint surfaces 163A, 163B of the secondary core 161 also communicate with the outside via the open portion of the receptacle 130 when the cover 131 is opened as in Embodiment 7 of the present invention (see FIG. 22), extraneous substances sticking to the joint surfaces 163A, 163B are easily found out. The cleaning of the joint surface 163A of the cylindrical portion 161A and that of the joint surface 163B of the prism portion 161B (see FIG. 22) may be carried out separately during the cleaning work.

Other Embodiments

The present invention is not limited to the above-described embodiments with reference to the drawings but may technically include, for example, the following embodiments thereof and may also modified in various manners without departing from the scope and spirit of the invention.

(1) Although a description has been given of the case where the group of magnets are used for surrounding the coil according to the aforesaid embodiments of the present invention, the group of magnets may be placed separately from the coil according to the present invention.

(2) Although it has been arranged to perform the operation of releasing the engagement on the part of the power-supply-side connector in Embodiments 2 to 4 of the present invention, the group of magnets of the vehicle-side connector may be made rotatable and also provided with an engagement releasing unit according to the present invention, so that the operation of releasing the engagement is performed on the part of the vehicle-side connector.

(3) Although a description has been given of the inductive type in which the connector makes use of electromagnetic induction, the present invention may be applied to conductive type connectors in which terminals of a power-supply-side circuit are brought into direct contact with those of a vehicle-side circuit.

(4) Electromagnets instead of permanent magnets may be used according to the aforesaid embodiments of the present invention.

(5) Any desired number of magnets instead of 16 pieces of them may be used according to the aforesaid embodiments of the present invention.

(6) In Embodiment 2 of the present invention, a spring member for urging the slider upward in FIG. 6 may be used. Thus, the operating force of shifting the permanent magnets of the power-supply-side by one pitch against magnetic attraction becomes reducible.

In Embodiment 2 of the present invention, further, a spring member for urging the slider toward the inner part of a lock portion (to the right in FIG. 6) may be used. Since the slider is held in the lock portion at the time of engaging operation, there is no possibility that the retaining pin interferes with the rotational movement of the group of permanent magnets of the power-supply-side connector.

Needless to say, a spring member for urging the slider upward and another spring member for urging it toward the inner part of the lock portion (to the right in FIG. 6) both may be used.

(7) Although it has been arranged in Embodiment 4 of the present invention to shift the group of permanent magnets by one pitch through the operation of the trigger, the driven link may be turned by, in place of such a trigger, manually operating the slider or axially moving the plunger of an electromagnet (in a direction perpendicular to the direction in which the group of permanent magnets are rotated).

(8) Although the fixed positioning pins 19A has been used in Embodiment 2 of the present invention, such a positioning pin may be made movable from a position where it is projected from the facing side of the connector to a position where it is not projected from the facing side thereof and provided in such a state that it has been urged in the direction in which it is so projected. Since the groups of magnets of both connectors are subjected to proper positioning while they are set closer to one another, both connectors are easily held in a concentric condition as magnetic attraction strongly acts. Therefore, the work of positioning both connectors is facilitated.

(9) Although it has been arranged according to the aforesaid embodiments of the present invention that only the magnetic attraction of magnets is used to hold the engagement of both connectors, a lock mechanism may be used for locking the engagement of both connectors. The lock mechanism may be such that it functions as what causes a pawl of one connector to be retained by a recess of the other connector with, for example, the relative rotation of groups of magnets which results in establishing a positional relationship for generating magnetic attraction.

The provision of such a lock mechanism further improves the reliability of keeping connectors into engagement with each other as the retaining force of the lock mechanism is added to the magnetic attraction for use in forcing the connectors to engage with each other.

(10) Although it has been arranged in Embodiment 5 of the present invention that the force of holding both connectors gradually by shifting the time of cutting off the voltage application to the plurality of electromagnets, the magnetic force may be reduced by gradually lowering the voltage application to the whole electromagnet so as to gradually release the connector-to-connector holding force.

Figure 23:
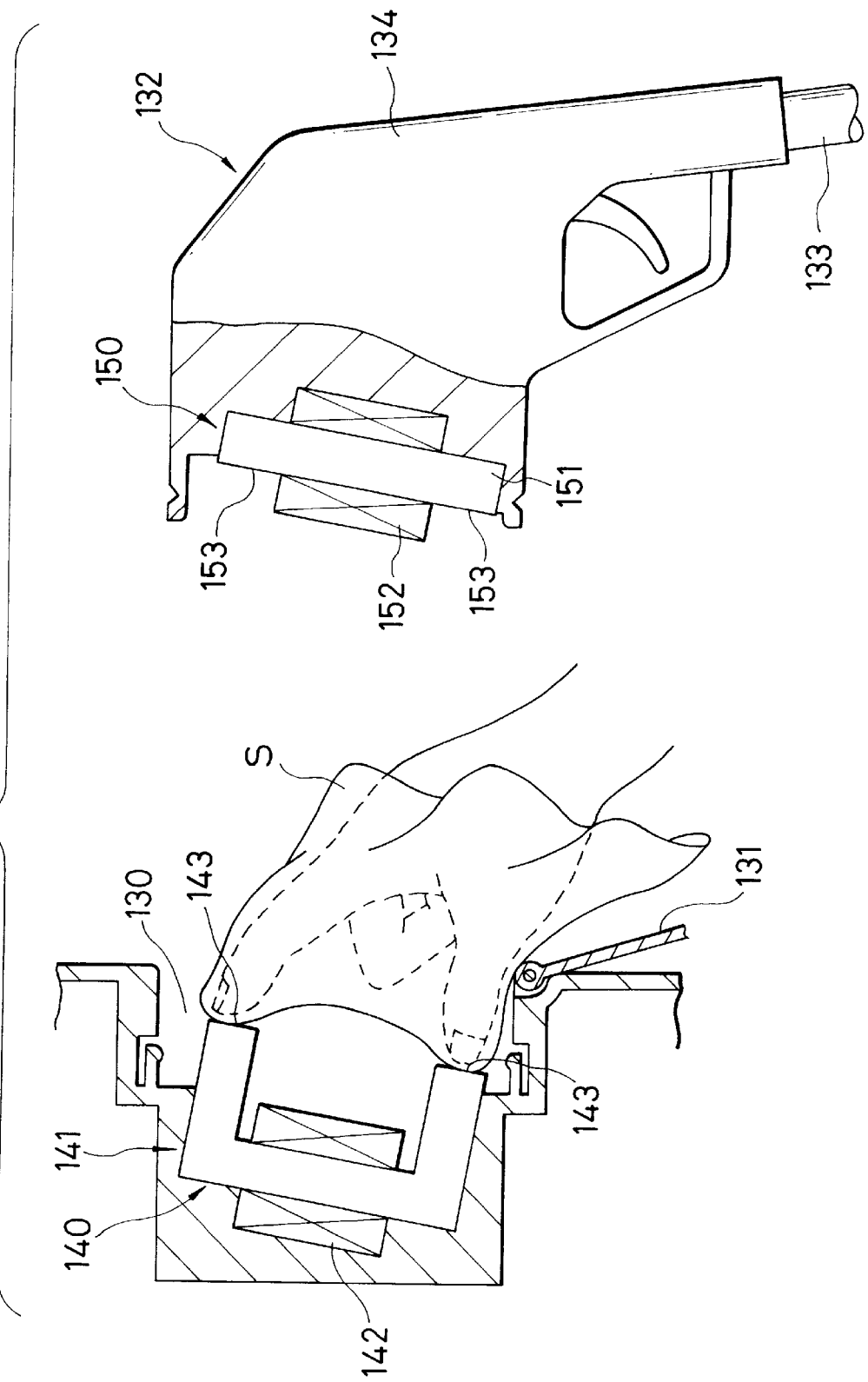
FIG. 23 is a side sectional view showing a situation in which the work of cleaning the core is being done according to a modified example 1 of the present invention.
Figure 24:
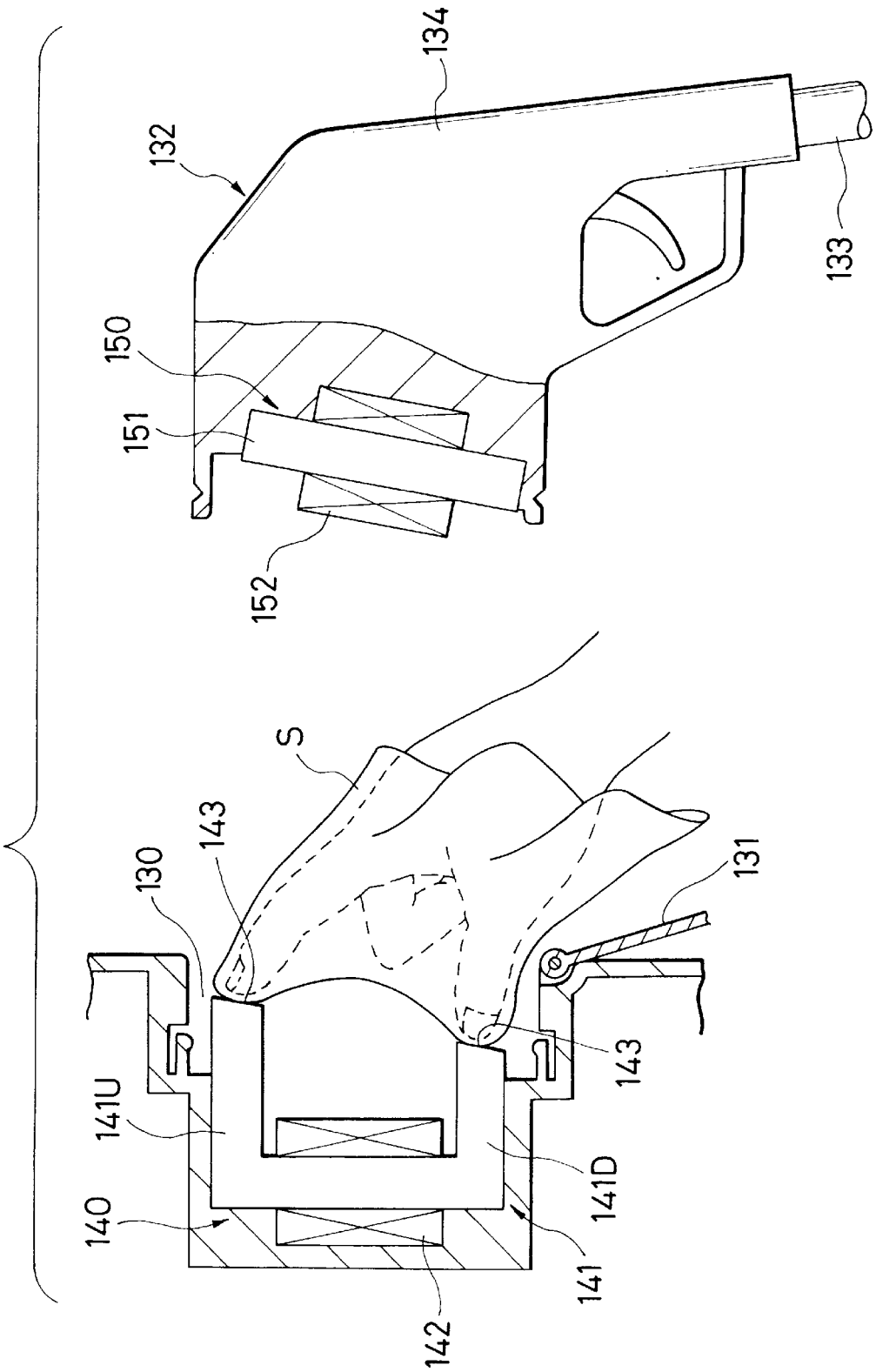
FIG. 24 is a side sectional view showing a situation in which the work of cleaning the core is being done according to a modified example 2 of the present invention.

(11) Although the joint surfaces of the secondary core have been made to face the front with respect to the open portion of the recess according to each of the embodiments 1, 7 and 8 of the present invention, the joint surfaces thereof are, strictly speaking, not necessarily required to face the front but may face obliquely with respect to the open portion as long as stains are confirmable and the work of cleaning the joint surfaces can be down easily by pressing cleaner against them. As shown in FIG. 23, for example, the secondary core itself in Embodiment 7 of the present invention may be placed obliquely with respect to the receptacle 130. As shown in FIG. 24, further, the lower opposed side 141D of the secondary core 141 in Embodiment 7 of the present invention may be shorter than the upper opposed side 141U thereof and the front ends of them may be cut slantwise in the axial direction.

Figure 25:
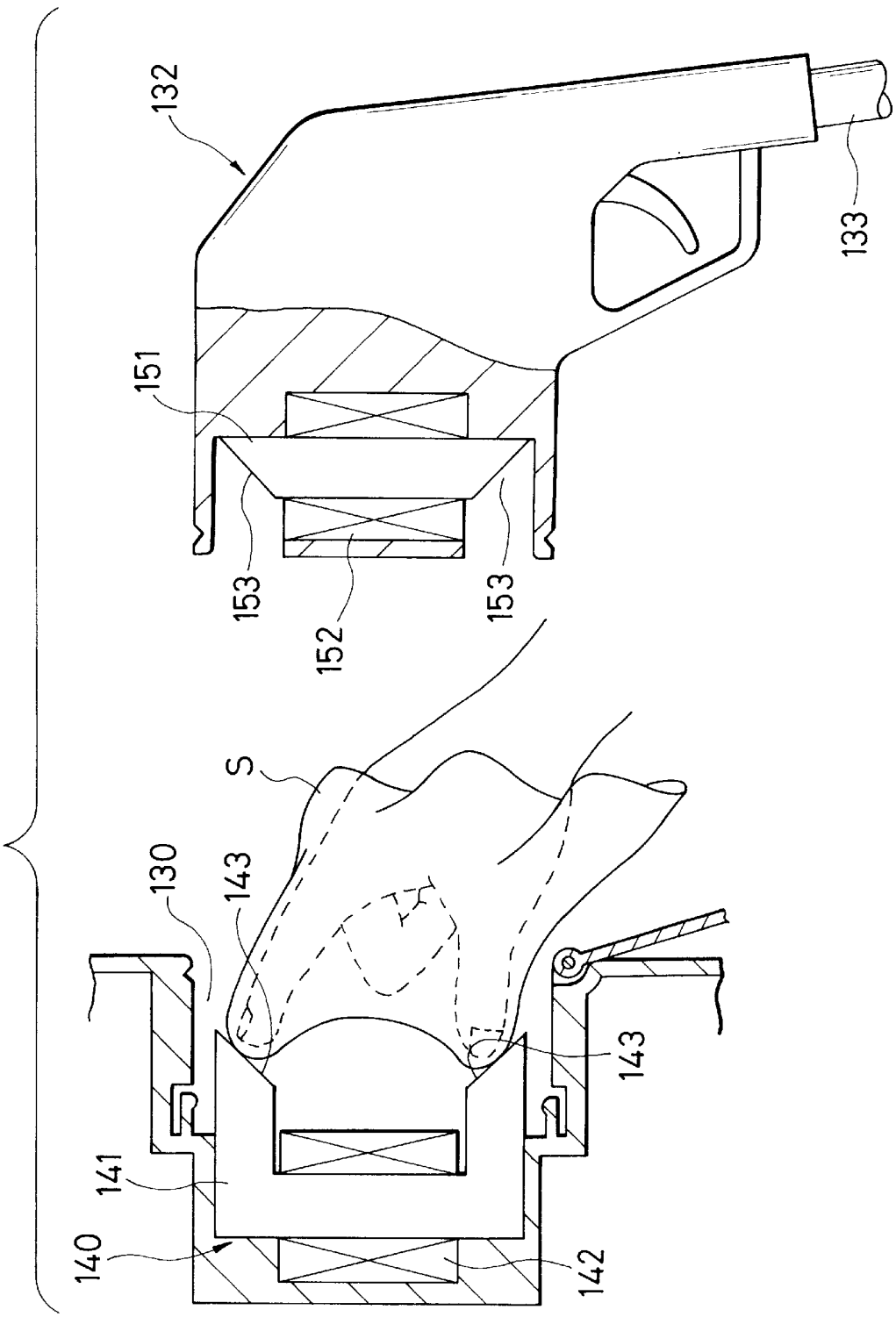
FIG. 25 is a side sectional view showing a situation in which the work of cleaning the core is being done according to a modified example 3 of the present invention.
Figure 26:
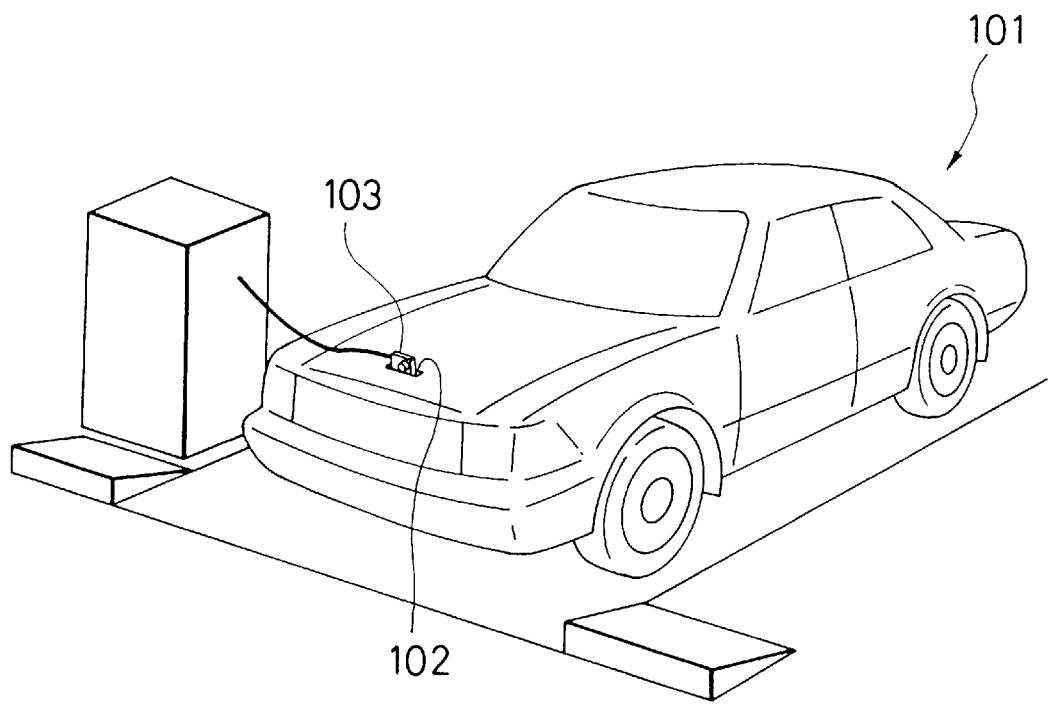
FIG. 26 is a perspective view of an aspect of a conventional electric vehicle.
Figure 27:
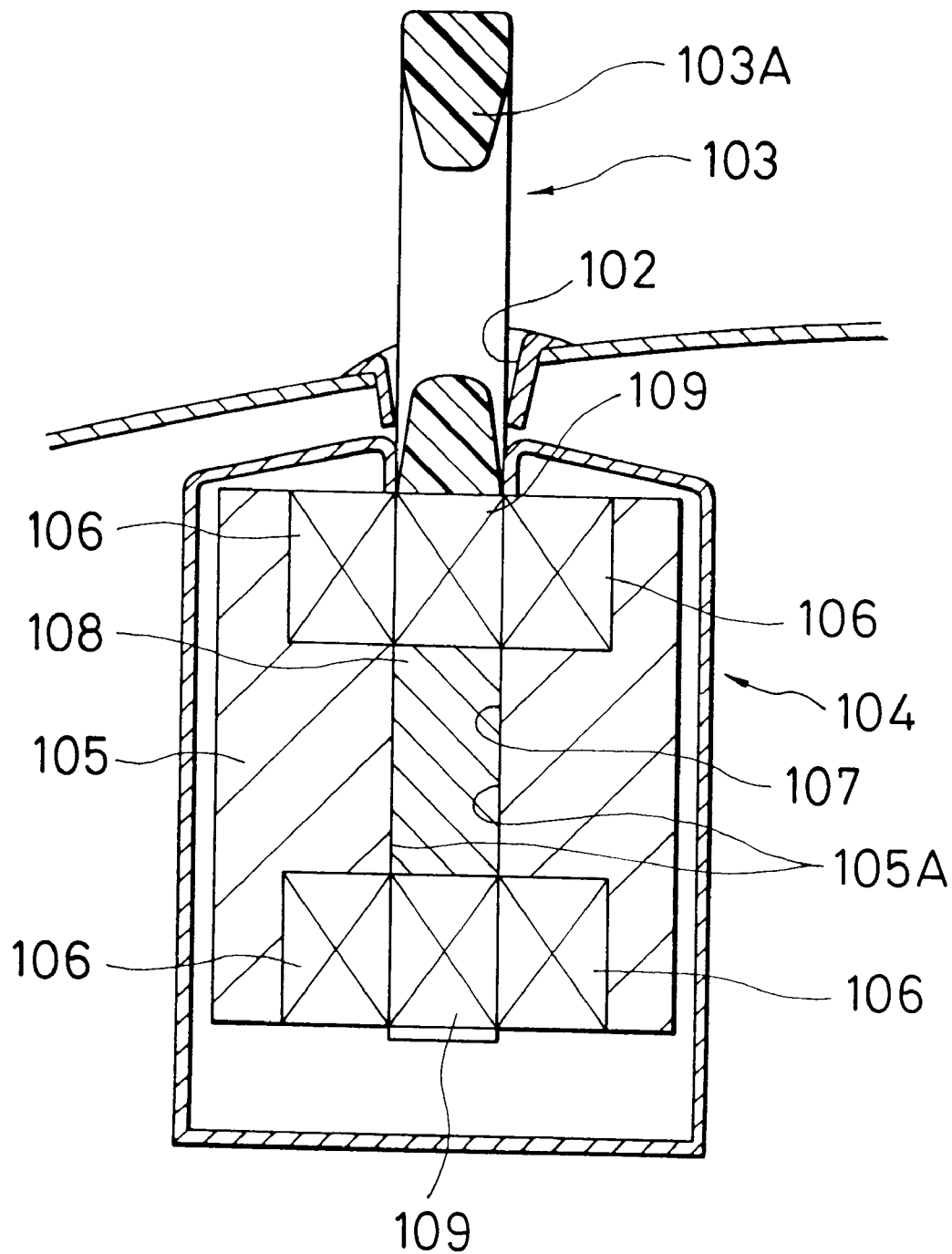
FIG. 27 is a side sectional view of a conventional charging apparatus.

(12) Although the joint surfaces of the secondary core according to each of the embodiments of the present invention have been made to face toward the same direction, the joint surfaces 143, 143 of the secondary core in Embodiment 7 of the present invention, for example, may be directed to different directions as shown in FIG. 25.

What is claimed is:

1. A charging connector for an electric vehicle being connectable to another connector so as to charge a storage battery of the electric vehicle, comprising:

a magnet that is magnetically attracted to a magnetic material disposed on the other connector, the magnet located relative to a power exchange portion of the charging connector such that the magnetic force generated between the magnet and the magnetic material is utilized for bringing the charging connector and the other connector into engagement with each other such that the power exchange portion of the charging connector is coupled to a power exchange portion of the other connector whereby charging can be performed.

2. A charging connector for an electric vehicle as recited in claim 1, wherein the magnet is an electromagnet whose magnetic force is changeable and wherein the charging connector is made detachable from the other connector by gradually releasing the magnetic force applied between the magnet and the magnetic material to bring the connectors into engagement with each other.

3. A charging connector for an electric vehicle as recited in claim 2, wherein the charging connector has a plurality of magnets arranged in a predetermined position on a first side of the charging connector that faces the other connector and wherein the magnetic force is gradually released beginning from the magnets in a region closer to one end of the first side of the charging connector and proceeding to the magnets in another region closer to another end of the first side of the charging connector, whereby the charging connector is made detachable from the other connector.

4. A charging device for an electric vehicle comprising:

a vehicle-side connector which is connectable to a storage battery mounted in a vehicle body and is mountable on the vehicle body; and a power-supply-side connector which is connectable to a power supply for supplying charging electric power, wherein respective groups of magnets are provided on respective facing sides of the vehicle-side connector and the power-supply-side connector in such a way that the N and S poles of a plurality of magnets are alternately arranged in a circle; the magnetic attraction generated by placing opposite poles of the magnets in the respective groups of magnets opposite to one another is utilized for bringing the vehicle-side connector and the power-supply-side connector into engagement with each other; and the magnetic repulsive force generated by placing like poles of the magnets in the respective groups of magnets opposite to one another is utilized for detaching the power-supply-side connector from the vehicle-side connector.

5. A charging device for an electric vehicle as recited in claim 4, wherein in both groups of magnets, said plurality of magnets are arranged with an equal-angle pitch.

6. A charging device for an electric vehicle as recited in claim 4, further comprising:

a positioning systems for regulating a floating of the vehicle-side connector and the power-supply-side connector in a direction along the facing sides.

7. A charging device for an electric vehicle as recited in claim 6, wherein the group of magnets of one of the vehicle-side connector and power-supply-side connector are fixedly mounted thereon, whereas the group of magnets of the other connector are rotatably mounted on said facing side thereof, whereby at a time of engagement, after positioning the vehicle-side connector and the power-supply-side connector by the positioning system, the group of magnets of the other connector is rotated so as to place opposite poles of the magnets in the respective groups of magnets opposite to one another.

8. A charging connector for an electric vehicle as recited in claim 7, wherein the group of magnets of the other connector is rotatably supported on the other connector by a bearing.

9. A charging connector for an electric vehicle as recited in claim 7, further comprising:

an engagement releasing unit for releasing the engagement between the vehicle-side connector and the power-supply-side connector, the engagement releasing unit rotating the group of magnets rotatable on the facing side so as to place like poles of the magnets in the respective groups of magnets opposite to one another.

10. A magnetic coupling apparatus for charging a power battery of an electric vehicle by an external charging power supply, comprising:

a primary core with a primary coil which is wound on the primary core, coupled to the external charging power supply, and a secondary core, having joint surfaces provided on a same plane, coupled to the power battery, a secondary coil being wound on the secondary core, said primary and secondary cores being jointable to one another so as to constitute a closed loop magnetic circuit, wherein the secondary core is accommodated in a recess so formed as to have an open portion in the exterior of the electric vehicle, and the joint surfaces of the secondary core jointing the primary core face the open portion side of the recess.

11. A charging device for an electric vehicle, comprising:

a first connector having a magnetic material, and a second connector being connectable with the first connector, and having a magnet that is magnetically attracted to the magnetic material and located relative to a power exchange portion of the charging connector such that a magnetic force generated between the magnet and the magnetic material is utilized for bringing the first and second connectors into engagement with each other such that the power exchange portion of the charging connector is coupled to a power exchange portion of the other connector whereby charging can be performed.

12. A charging device for an electric vehicle as recited in claim 11, wherein the magnet is an electromagnet whose magnetic force is changeable and wherein the second connector is made detachable from the first connector by gradually releasing the magnetic force applied between the magnet and the magnetic material to bring the connectors into engagement with each other.

13. A charging device for an electric vehicle as recited in claim 12, wherein the second connector has a plurality of connector holding magnets, the connector holding magnets are arranged in the predetermined position of one side facing the first connector and wherein the magnetic force is gradually released from the connector holding magnets in a region closer to one part of the side facing the first connector to the connector holding magnets in the other region so that the second connector is made detachable from the first connector.

14. A charging connector for an electric vehicle as recited in claim 1, wherein detachment of the charging connector from the other connector is facilitated by an engagement releasing unit.

15. A charging device for an electric vehicle as recited in claim 11, wherein detachment of the first connector from the second connector is facilitated by an engagement releasing unit.

* * * * *